United States Patent
Kinoshita

(10) Patent No.: US 7,936,902 B2
(45) Date of Patent: *May 3, 2011

(54) FACE FEATURE POINT DETECTION APPARATUS AND FEATURE POINT DETECTION APPARATUS

(75) Inventor: Koichi Kinoshita, Kyoto (JP)

(73) Assignee: Omron Corporation, Kyoto (JP)

( * ) Notice: Subject to any disclaimer, the term of this patent is extended or adjusted under 35 U.S.C. 154(b) by 833 days.

This patent is subject to a terminal disclaimer.

(21) Appl. No.: 11/667,670

(22) PCT Filed: Nov. 12, 2004

(86) PCT No.: PCT/JP2004/016889
§ 371 (c)(1),
(2), (4) Date: Nov. 20, 2007

(87) PCT Pub. No.: WO2006/051607
PCT Pub. Date: May 18, 2006

(65) Prior Publication Data
US 2008/0130961 A1 Jun. 5, 2008

(51) Int. Cl.
*G06K 9/00* (2006.01)
(52) U.S. Cl. .......................... 382/103; 382/118; 348/169
(58) Field of Classification Search .................. 382/103, 382/118, 154, 285, 286, 291; 348/42–60, 348/169; 345/419–427
See application file for complete search history.

(56) References Cited

U.S. PATENT DOCUMENTS

| 5,982,912 | A | 11/1999 | Fukui et al. | |
| 5,995,639 | A * | 11/1999 | Kado et al. | 382/118 |
| 2003/0234871 | A1 | 12/2003 | Squilla et al. | |
| 2006/0269143 | A1 * | 11/2006 | Kozakaya | 382/218 |
| 2007/0031028 | A1 * | 2/2007 | Vetter et al. | 382/154 |
| 2007/0183665 | A1 * | 8/2007 | Yuasa et al. | 382/195 |

(Continued)

FOREIGN PATENT DOCUMENTS

JP 9-251534 9/1997

(Continued)

OTHER PUBLICATIONS

Donner et al., "Fast Active Appearance Model Search Using Canonical Correlation Analysis" IEEE Transactions on Pattern Analysis and Machine Intelligence, vol. 28, No. 10, pp. 1690-1694, Oct. 2006.

(Continued)

*Primary Examiner* — Aaron W Carter
(74) *Attorney, Agent, or Firm* — Dickstein Shapiro LLP

(57) ABSTRACT

Plural nodes are arranged at predetermined initial positions, and feature values at plural sampling points around each node are obtained as a node feature value of each corresponding node. An error estimator indicating displacement between the current position of each node and the position of corresponding feature point is obtained based on correlation information on a difference between the node feature value obtained in a state in which the plural nodes are arranged at correct positions of the corresponding feature points and the node feature value obtained in a state in which the plural nodes are arranged at wrong positions of the corresponding feature points in a learning image, correlation information on a difference between the correct position and the wrong position, and a node feature value of each node. The position of each feature point is estimated in an input image based on the error estimator and the current position of each node.

20 Claims, 9 Drawing Sheets

U.S. PATENT DOCUMENTS

| | | | |
|---|---|---|---|
| 2007/0201729 A1* | 8/2007 | Yuasa et al. | 382/118 |
| 2007/0217683 A1* | 9/2007 | Kinoshita | 382/190 |
| 2007/0258645 A1* | 11/2007 | Gokturk et al. | 382/190 |
| 2008/0130961 A1* | 6/2008 | Kinoshita | 382/118 |
| 2008/0192990 A1* | 8/2008 | Kozakaya | 382/117 |
| 2008/0219501 A1* | 9/2008 | Matsumoto | 382/103 |

FOREIGN PATENT DOCUMENTS

| | | |
|---|---|---|
| JP | 2004-30668 | 1/2004 |

OTHER PUBLICATIONS

Langs et al., "Active Feature Models*" Institute for Computer Graphics and Vision, Graz University of Technology, Austria, Pattern Recognition and Image Processing Group, Vienna University of Technology, Austria, Department of Radiology, Medical University of Vienna, Austria, IEEE, 2006.

Yan, S., "Face Alignment Using Texture-Constrained Active Shape Models" Image and Vision Computing, vol. 21, No. 1, pp. 69-75, Jan. 10, 2003.

Hou, XW., "Direct Appearance Models" Proceedings 2001 IEEE Conference on Computer Vision and Pattern Recognition. CVPR 2001. Kauai, Hawaii, Dec. 8-14, 2001; [Proceedings of the IEEE Computer Conference on Computer Vision and Pattern Recognition], Los Alamitos, CA, IEEE Comp. Soc., US, vol. 1, Dec. 8, 2001, pp. 828-833.

Cootes, T.F., "Comparing Active Shape Models with Active Appearance Models" Proceedings of the British Machine Vision Conference, XX, XX, vol. 1, Jan. 1, 1999, pp. 173-182.

Smeraldi, F., Retinal Vision Applied to Facial Features Detection and Face Authentication Pattern Recognition Letters, Elsevier, Amsterdam, NL LNKD-DOI:10.1016/S0167-8655(01)00178-7, vol. 23, No. 4, Feb. 1, 2002, pp. 463-475.

Okada, K., "Analysis and Synthesis of Pose Variations of Human Faces by a Linear PCMAP Model and Its Application for Pose-Invariant Face Recognition System" Automatic Face and Gesture Recognition 2000. Proceedings. Fourth IEEE International Conference on Grenoble, France Mar. 28-30, 2000, Los Alamitos, CA, USA, IEEE Comput. Soc., US LNKD-DOI:10.1109/AFGR.2000.840625, Mar. 28, 2000, pp. 142-149.

Song, G., "Hierarchical Direct Appearance Model for Elastic Labeled Graph Localization" Proceedings of the SPIE, vol. 5286, Sep. 2003, pp. 139-144.

Zhao, S., "Enhance the Alignment Accuracy of Active Shape Models Using Elastic Graph Matching" Jul. 15, 2004, Biometric Authentication; [Lecture Notes in Computer Science;;LNCS], Springer-Verlag, Berlin/Heidelberg, pp. 52-58.

* cited by examiner

FACE FEATURE POINT DETECTION APPARATUS AND FEATURE POINT DETECTION APPARATUS

BACKGROUND OF THE RELATED ART

1. Field of the Invention

The present invention relates to an effective technique applied to an apparatus, a method, and a program for detecting a feature point of a target object from an image.

2. Description of the Related Art

Conventionally, in a technique of detecting the feature point of a target object from an image, there is a technique of detecting the feature point of a face which is set to the target object. The background art in the case where the face is set to the target object will be described below.

For example, information regarding whether the eyes of a person are opened or closed, a face attitude, a direction of a visual line, and an expression of the face can be estimated by obtaining a feature point position of the face from an image in which the person is photographed. A state of the person can be acknowledged in detail from the estimation result. The detailed acknowledgement of the state of the person can achieve the performance improvement of a man-machine interface or provision of new service. Thus, in development of a man-machine interface, one important problem is to correctly know the feature point position of the face.

A driver monitoring system is an example of the man-machine interface. Opening and closing of the eyes of the driver, the face attitude, the direction of the visual line, and the like are sequentially observed in the driver monitoring system. A fatigue degree of the driver is determined based on the observation result, which allows appropriate advice to be given according to a situation.

Another example of the man-machine interface is the application of the man-machine interface to a moving picture video camera and a still image camera. In these devices, various kinds of processing such as a change in imaging condition can be performed by knowing the face attitude of a person to be photographed. Additionally, individuals can be identified with high accuracy by analyzing in detail the image of feature points such as the eyes and a mouth.

With respect to a method of obtaining the feature point position of the face from the image (hereinafter referred to as "feature point detection method"), a method in which template matching is utilized and applications thereof are usually used. In these methods, general information on each feature point (hereinafter referred to as "feature value") is previously stored. A determination whether or not the feature point should be obtained is made by comparing a feature value obtained from a part of an area in the image to a stored feature value. A specific example of the feature value used at this point includes a brightness value vector of the image. Usually normalized correlation and a Euclidean distance are used in means for comparing the feature values.

In such techniques, there is proposed a technique of detecting a feature point candidate with pattern matching after the number of searching points are previously decreased by a separation filter (see Japanese Patent Laid-Open Patent No. 9-251534). In the technique disclosed in Japanese Patent Laid-Open Patent No. 9-251534, after the feature point candidate is detected, a geometrical constraint condition is applied to output a combination of candidate points which is determined as a most-likely human face.

However, in the technique disclosed in Japanese Patent Laid-Open Patent No. 9-251534, the feature points of the image of a person can be detected only under a good photographing condition in which the person is orientated toward a substantially frontward direction. Accordingly, it is difficult to correctly detect the feature points from the image in which a part of the feature points is hidden by an obstacle or the image which differs largely from the image including the previously stored feature points in the photographing condition (for example, lighting condition).

There is a technique of obtaining the feature point position of the face to estimate the face attitude (see Japanese Patent Laid-Open Patent No. 2000-97676 and Japanese Laid-Open Patent No. 2003-141551). In such techniques, usually, after the feature point position of the face is obtained, the estimation is performed using the whole of arrangement or the feature value. For example, a relationship between the face attitude and the coordinate of the feature point indicating the eyes, the mouth, eyebrows, or a nose is previously stored as a look-up table. The face attitude corresponding to the coordinate of the feature point obtained from the image is determined from the look-up table and outputted as the estimation result. Additionally, there is a technique in which templates of the whole of the face or the feature value of the face are prepared for plural orientations of the face and the face attitude is determined by matching with the templates. However, in these techniques, whether or not the face attitude can correctly be estimated depends on the accuracy of the feature point position of the face. Accordingly, the face attitude cannot correctly be estimated unless the feature point position of the face is correctly obtained.

In order to solve the problem, there is a technique called ASM (Active Shape Model) (see A. Lanitis, C. J. Taylor, T. F. Cootes, "Automatic Interpretation and Coding of Face Images Using Flexible Models." IEEE PAMI Vol. 19 No. 7 pp. 743-756, July 1997). In ASM, the feature point position is previously obtained for a learning face image, and a face shape model is produced and retained. The face shape model is formed by nodes corresponding to the face feature points. The detailed face shape model will be described below and processing for detecting the feature point position from the image with ASM will be described.

The face shape model is arranged at proper initial positions of the image which becomes the processing target. Then, the feature values are obtained around each node of the face shape model. In each node, the obtained feature value is compared to the feature value which is retained while previously corresponding to the node. As a result of the comparison, the feature value which is closest to the feature value corresponding to each node is moved to the obtained position (i.e., it is determined that the position has the highest possibility of the feature point corresponding to each node). At this point, the positions of the nodes of the face shape model are displaced from the initial positions. Therefore, a set of the deformed nodes is shaped by projecting the set of the deformed nodes to the face shape model. The processes from obtaining the feature value around each node are repeated a predetermined number of times or until a predetermined condition (convergence condition) is satisfied. Then, it is determined that the final position of each node is the position of each feature point.

Thus, in ASM, the projection is performed to the face shape model after the position of each node is moved. The feature point position can correctly be detected through the processing while the positional relationship among the nodes maintains the face-like shape. That is, even if a portion having the feature value similar to that of the feature point exists accidentally at the position located not far away from the shape of the general human face, the wrong detection in which the point is detected as the feature point can be prevented.

However, in the conventional ASM, it is necessary to perform searching processing (obtaining the feature value and comparison thereof around each node. Therefore, there is a drawback that a large amount of time is required for computation. Additionally, in the conventional ASM, there is a problem that robustness is low. That is, in the case where the orientation of the face in the image which becomes the processing target differs largely from the orientation of the face which is expected in the face shape model arranged at the initial positions, there is a problem that failure of the feature point detection is frequently generated.

In order to solve the problem of ASM, there is a technique of AAM (Active Appearance Model) (see Non-patent Document 2: T. F. Cootes, G. J. Edwards and C. J. Taylor. "Active Appearance Models", IEEE PAMI, Vol. 23, No. 6, pp. 681-685, 2001). In AAM, the position of the face feature point is determined as follows. As with ASM, the feature point position is obtained for the learning face image to produce the face shape model. Then, an average value of the node positions is obtained to produce an average shape model including the set of nodes of the average positions. Then, plural patches including the feature points are formed in the learning face image, each patch is projected to the average shape model to produce a shape-free image (the processing is referred to as "shape correction processing"). A face brightness value model (shape-free face brightness value model) is produced by performing the principal component analysis to the set of shape-free images. Then, a shape-free face brightness value vector is determined when the face shape model is finely displaced at constant intervals from the correct position toward each direction. Linear regression is computed for the sets. Therefore, the movement, the deformation direction, and the deformation amount to the correct point of the face shape model can be estimated from the finely-displaced face brightness value vector. In AAM, the above processing is previously performed as learning processing.

Processing for detecting the feature point position from the image with AAM will now be described. The face shape model is arranged at proper initial positions of the image which becomes the processing target. Then, the patches are produced based on the node positions of the arranged face shape model, and a brightness distribution is sampled in each patch. The sampled brightness distribution is projected to produce the shape-free face brightness value model.

Then, the movement and deformation amount of the face shape model are estimated from the shape-free face brightness value model using the previously determined regression equation. The face shape model is moved and deformed according to the estimation result. The processing is repeated a predetermined number of times or until a predetermined condition (convergence condition) is satisfied. Then, it is determined that the final position of each node is the position of each feature point.

Thus, according to AAM, each feature point position can be detected without performing the searching processing around each node. Therefore, unlike ASM, the time is not required for the searching processing around each node, and the computation time can be decreased. Furthermore, because the searching is performed by deforming the shape model, like the ASM, the feature point position can correctly be detected while the position relationship among the nodes maintains the face-like shape.

However, there is the following problem in AAM. In order to maintain the detection accuracy of each feature point position with AAM, it is necessary to perform homogeneous and high-density sampling in obtaining the brightness distribution of each patch. Therefore, the computation amount becomes excessively large in the sampling and in projecting the brightness distribution to the average shape model, and the large amount of computation time is requires. Additionally, in AAM, the movement amount and deformation amount of the face shape model are estimated based on the linear regression by the fine displacement about the correct point. Therefore, the estimation cannot correctly be performed for the large displacement, and the correct result cannot be obtained.

In the processing with the conventional ASM or AAM, the feature point cannot be detected at high speed, because a large amount of computation time is required in the searching processing or the shape correction processing of the brightness distribution with the homogeneous and high-density sampling. However, as described above, because the feature point detection result is utilized as the input data in the man-machine interface and the like, high response is frequently demanded in detecting the feature point. Therefore, needs of high-speed feature point detection is actually increased.

In view of the foregoing, an object of the invention is to provide an apparatus and a program which enables the feature point position to be detected from the face image at high speed.

SUMMARY OF THE INVENTION

Conventionally, like AAM, error estimation is usually performed (movement direction and movement amount to the correct point of each node are estimated in the face shape model) by performing shape correction processing. Accordingly, elimination of shape correction processing has not been studied in performing the error estimation. However, when a cause of the increase in computation time is studied in the conventional AAM, the required shape correction processing can be cited as the cause of the increase in computation time. Therefore, the inventor has studied an apparatus in which the face feature point can be detected without performing the shape correction processing.

Conventionally, in order to maintain the high accuracy of the error estimation, the high-density sampling is usually performed around each node. For example, in the conventional AAM, because the homogeneous and high-density sampling (specifically, the sampling for usually at least ten thousand times) is required in the patch including the nodes, the performance of low-density sampling has not been studied in performing the error estimation. However, the homogeneous and high-density sampling can also be cited as one of the causes of the increase in computation time in the conventional AAM. Therefore, the inventor has studied the apparatus in which the face feature point can be detected without performing the homogeneous and high-density sampling.

In the error estimation with the conventional AAM, the sampling is performed in the patch including the nodes. Therefore, when the sampling result is treated as a surface of the patch, the processing accuracy is hardly maintained unless the deformation associated with the movement of the node based on the result of the error estimation is corrected by the shape correction processing. However, in the case where the inhomogeneous and low-density sampling is performed to the plural points around each node, the point is not deformed even if the shape is deformed, and the sampling point is low density. Therefore, the inhomogeneous and low-density sampling is hardly affected by the shape deformation associated with the movement of the node. Accordingly, the processing accuracy can be maintained without particularly performing the shape correction processing. The following face feature point detection apparatus is proposed based on the above-described study result.

A face feature point detection apparatus according to a first aspect of an embodiment of the invention includes arrangement means, feature value obtaining means, storage means, error estimator obtaining means, and estimation means. The arrangement means arranges plural nodes at predetermined initial positions of an input image. Each node corresponds to a feature point in a face image of a human. In one embodiment, the initial position is a position which is brought close to the corresponding feature point of each node in the input image. Accordingly, the initial position may be previously determined based on such references. For example, the center of the screen can be set to the initial position based on experience that the human face is frequently imaged in the center of the screen.

The feature value obtaining means arranges the plural sampling points around each node arranged by the arrangement means. Then, the feature value obtaining means obtains feature values at the plural sampling points as a node feature value of each corresponding node. Specific examples of the feature value include pixel brightness, a Sobel filter feature value, a Harr Wavelet feature value, a Gabor Wavelet feature value, and a composite value thereof. The arrangement of the sampling point may be inhomogeneous and low density.

A previously-performed learning result is stored in the storage means. The learning result is obtained by performing the learning processing to the plural learning images. Specifically, the following pieces of correlation information on two values are previously obtained as the learning result. One of the values is a difference between a node feature value obtained in a state in which the plural nodes are arranged at correct positions of the corresponding feature points in a learning image respectively and a node feature value obtained in a state in which the plural nodes are arranged at positions displaced from the correct positions of the corresponding feature points. The other value is a difference between the correct position in each node and the position displaced from the correct position. The pieces of correlation information on the two values are obtained by an analytical technique such as canonical correlation analysis, linear regression, linear multiple regression, and non-linear multiple regression.

The error estimator obtaining means obtains an error estimator indicating a displacement between the current position of each node and the position of the corresponding feature point based on the correlation information stored in the storage means and the node feature value of each node. The node feature value of each node is obtained by the feature value obtaining means.

The estimation means estimates the position of each feature point in the input image based on the error estimator obtained by the error estimator obtaining means and the current position of each node. That is, the face feature point detection means detects the feature point at each position estimated by the estimation means.

According to the first aspect of an embodiment of the invention, the shape correction processing is not required. In other words, according to the first aspect of an embodiment of the invention, the shape correction processing is not performed. Therefore, many processes necessary for the shape correction processing can be eliminated to achieve the speed enhancement of the processing.

Additionally, according to the first aspect of an embodiment of the invention, it is not necessary to perform the searching processing around each node, and it is not necessary that the high-density sampling be performed to the surface in a patch formed by the nodes. Therefore, the large amount of computation necessary for the conventional sampling can be eliminated.

The man-machine interface can be operated at high speed by the speed enhancement of the face feature point detection processing. For example, in the driver monitoring system, high-speed response is required due to the nature thereof. The first aspect of an embodiment of the invention can therefore solve the problem which is not realized by the conventional technique.

The face feature point detection apparatus according to the first aspect of an embodiment of the invention may further include end determination means for determining end of repetitive processing. For example, the end determination means may be configured to count the number of times at which the repetitive processing is performed, and to determine the end of the repetitive processing when the number of times reaches a predetermined number. In the case where the end determination means is further included, the arrangement means moves the current position of each node based on the error estimator when the error estimator is obtained, the arrangement means and the error estimator obtaining means perform the repetitive processing, and the estimation means estimates the position of each feature point in the input image based on the error estimator at that point in time when the end determination means determines end of repetitive processing and the position of each node at that point.

According to the first aspect of an embodiment of the invention, the error estimator is determined again based on the new position of each node which is moved based on the error estimator, and the processing is repeated. The position of each feature point is estimated based on the error estimator at that point in time when the end determination means determines the end of the repetitive processing and the position of each node at that time. Accordingly, the accuracy of the estimation is improved, when compared with the case in which the position of each feature point is estimated by obtaining the error estimator once based on the initial position of each node.

In the face feature point detection apparatus according to the first aspect of an embodiment of the invention, the end determination means may be configured to determine that the repetitive processing is ended when the error estimator obtained by the error estimator obtaining means becomes a threshold or less. Therefore, in the configuration, the position of each feature point can be detected with higher accuracy.

The face feature point detection apparatus according to the first aspect of an embodiment of the invention may include face detection means for detecting at least a human face or a position of an element of the human face, such as an organ or a region which is included in the face, for example, eye, nose, mouth, and/or forehead, from the input image. In such cases, the arrangement means determines an initial position of the each node based on the detected human face or the detected position of the element of the human face. Therefore, in the configuration, the initial position of each node is located at an appropriate position, i.e., a position brought close to the corresponding feature point. Therefore, the position of each feature point can be detected more correctly.

In the face feature point detection apparatus according to the first aspect of an embodiment of the invention, the face detection means may be configured to further detect an orientation of the human face. In such cases, the arrangement means has a node model in which a relative positional relationship among nodes is defined, and the arrangement means may be configured to use the node model while the node model is deformed based on the orientation of the face detected by the face detection means when each node is arranged at the initial position based on the node model. For example, when the face detection means detects that the face is orientated leftward, the arrangement means may deform each node of the node model such that the node is matched with the leftward-orientated face. Specifically, for example, the arrangement means may decrease a horizontal component of a vector between the nodes corresponding to the feature point located on the left side of the face, while the arrangement means may increase a horizontal component of a vector between the nodes corresponding to the feature point located on the right side of the face. The arrangement means may be configured to perform the above deformation processing for each direction when the face having another orientation is detected. Therefore, in the configuration, the position of each feature point can be detected more correctly, when compared with the case in which the previously-prepared node model is used with no deformation.

In the face feature point detection apparatus according to the first aspect of an embodiment of the invention, the face detection means may be configured to further detect a size of the human face. In such cases, the arrangement means may be configured to have a node model in which a relative positional relationship among nodes is defined, and the arrangement means may be configured to use the node model while the node model is deformed based on the size of the face detected by the face detection means when each node is arranged at the initial position based on the node model. For example, the arrangement means may be configured to use the node model while scaling is performed to the node model based on the size of the face detected by the face detection means. Therefore, in the configuration, the position of each feature point can be detected more correctly, when compared with the case in which the previously-prepared node model is used with no deformation.

In the face feature point detection apparatus according to the first aspect of an embodiment of the invention, the face detection means may be configured to further detect an orientation of the human face. In such cases, the arrangement means may be configured to have plural node models according to the orientation of the face, and a relative positional relationship among nodes is defined in the node model. For example, the arrangement means may be configured to have the node models corresponding to the rightward-orientated face, the frontward-orientated face, the leftward-oriented face, the upward-orientated face, and the downward-orientated face. The storage means may be configured to store the correlation information corresponding to each node model, and the correlation information is previously obtained with the learning image in which each face of the corresponding orientation is taken. The arrangement means may be configured to select the node model used based on the orientation of the face detected by said face detection means when each node is arranged at said initial position based on said node model. The error estimator obtaining means may be configured to read and use said correlation information from said storage means, the correlation information corresponding to the node model selected by the arrangement means.

Therefore, in the configuration of the first aspect of an embodiment of the invention, the face feature point is detected with the node model dedicated to the orientation of the face detected by the face detection means and the correlation information corresponding to the node model. Accordingly, the position of each feature point can be detected more correctly, when compared with the case in which the one node model is always used.

In the face feature point detection apparatus according to the first aspect of an embodiment of the invention, the face detection means may be configured to further detect a size of the human face. In such cases, the arrangement means may be configured to have plural node models according to the size of the face, and a relative positional relationship among nodes is defined in the node model. The storage means may be configured to store the correlation information corresponding to each node model, and the correlation information is previously obtained with the learning image in which each face of the corresponding size is taken. The arrangement means may be configured to select the node model used based on the size of the face detected by the face detection means when each node is arranged at the initial position based on the node model. The error estimator obtaining means may be configured to read and use the correlation information from the storage means, the correlation information corresponding to the node model selected by the arrangement means.

Therefore, in the configuration of the first aspect of an embodiment of the invention, the face feature point is detected with the node model dedicated to the size of the face detected by the face detection means and the correlation information corresponding to the node model. Accordingly, the position of each feature point can be detected more correctly, when compared with the case in which the one node model is always used.

In the face feature point detection apparatus according to the first aspect of an embodiment of the invention, the feature value obtaining means may be configured to densely arrange the sampling points as the sampling point is brought close to the node, and the feature value obtaining means may be configured to non-densely arrange the sampling points as the sampling point is separated far away from the node. In the face feature point detection apparatus according to the first aspect of an embodiment of the invention, the feature value obtaining means may be configured to arrange the sampling points according to a retina structure. In the face feature point detection apparatus according to the first aspect of an embodiment of the invention, plural different retina structures may be configured to be stored in the feature value obtaining means, and the sampling points may be configured to be arranged according to the retina structure corresponding to each node.

In the face feature point detection apparatus according to the first aspect of an embodiment of the invention, the information on a correlation between the node feature value obtained in a state in which the plural nodes are arranged at the correct positions of the corresponding feature points in the learning image respectively and information indicating an attitude of the human face in the learning image may be configured to be previously stored in the storage means. In such cases, the face feature point detection apparatus according to the first aspect of an embodiment of the invention may further include attitude estimation means for estimating the attitude of the human face taken in the input image based on the position of each node estimated by the estimation means and the correlation information on the face attitude stored in the storage means.

Therefore, in the configuration, it can be determined how the human face included in the input image has the attitude. The attitude of the face may be expressed by an x-axis component, a y-axis component, and a z-axis component in the direction in which the face is orientated. In another embodiment, the attitude of the face may be expressed by the rightward-orientated state, the leftward-orientated state, the frontward-orientated state, the upward-orientated state, and the downward-orientated state.

A face feature point detection apparatus according to a second aspect of an embodiment of the invention which detects a face feature point in an input image with a face shape model used in an active shape model, the face feature point detection apparatus includes arrangement means, feature value obtaining means, storage means, error estimator obtaining means, changing means, and estimation means.

The arrangement means arranges the face shape model at an initial position of the input image.

The feature value obtaining means obtains plural feature values based on each node position of the face shape model arranged by the arrangement means according to a retina structure, and the feature value obtaining means obtains the plural feature values obtained based on the same node position as one node feature value.

A conversion vector matrix is stored as an error estimation matrix in the storage means. The conversion vector matrix is previously obtained by a canonical correlation analysis, and the canonical correlation analysis has inputs of a set of vectors indicating a difference between a set of node feature values obtained for the nodes of the face shape model in arranging the face shape model at a correct position and a set of node feature values obtained for the nodes in arranging the face shape model at a wrong position and a set of vectors indicating a difference between the position of each node in arranging the face shape model at the correct position and the position of each node in arranging the face shape model at the wrong position.

The error estimator obtaining means obtains an error estimator based on the error estimation matrix stored in the storage means and the set of node feature values obtained by the feature value obtaining means, and the error estimator indicates displacement between the current position of each node of the face shape model and the position of the face feature point.

The changing means changes the current position of each node of the face shape model based on the error estimator obtained by the error estimator obtaining means.

The estimation means estimates each node whose position is already changed by the changing means as the position of the face feature point.

The same action and effect as the first aspect of various embodiments of the invention can be obtained in the second aspect of an embodiment of the invention having the above configuration.

A feature point detection apparatus according to a third aspect of an embodiment of the invention includes arrangement means, feature value obtaining means, storage means, error estimator obtaining means, and estimation means. The feature point detection apparatus according to the third aspect of an embodiment of the invention differs from the face feature point detection apparatus according to the first or second aspect of an embodiment of the invention in that the target object which becomes the processing target is not limited to the face. Therefore, in feature point detection apparatus according to the third aspect of an embodiment of the invention, the arrangement means arranges plural nodes at predetermined initial positions of an input image, and the plural nodes correspond to plural feature points in an image of a predetermined target object.

Thus, the target object is not limited to the face described in the first aspect or second aspect of the various embodiments. That is, any target object may be used as long as the shape model can be set to the target object. For example, the target object may be the entire body of the human and/or an organ in a roentgen image or a Computerized Tomography (CT) image. In other words, the invention can be applied to a target object whose size varies between individuals and/or a target object which may be deformed while maintaining a basic shape. Additionally, because the shape model can be set, the invention can be applied to a target object of an industrial product having a rigid body, such as an automobile.

The first to third aspects of the various embodiments of the invention may be realized by a program executed by an information processing device. That is, in the invention, the processing performed by each means in the first to third aspects of the various embodiments can be specified as the program which is executed by the information processing device or a recording medium in which the program is recorded. The invention may be specified by a method in which the processing performed by each means is performed by the information processing device. An information processing device may be, for example, a personal computer, a digital camera, a digital video camera, a security camera, a portable telephone equipped with the digital camera, a digital video recorder, a server (including a server connected to a network) which performs image processing, a digital photo-printer, a minilab machine, and the like.

According to embodiments of the invention, shape correction processing and high-density sampling are not required when the feature point position of the face is detected from the face image. Therefore, the feature point detection processing can be realized at high speed.

DETAILED DESCRIPTION

In the following description, the term face image shall mean an image including an image of a part or the whole of a face of at least a person. Accordingly, the face image may include the image of the whole person or the face image may include only the face or only the upper body of the person. The face image may include an image of plural persons. The face image may include any pattern such as a scene and design except for the person in a background (the background also includes an object to which attention is as a subject).

The high-speed face feature point detection is realized by combining feature value sampling with the variable retina structure and error estimation matrix learning with canonical correlation analysis compared to ASM. The combination can realize the face feature point detection having high robustness. The technique proposed will be described below.

First, learning processing necessary to detect the face feature point will be described. Then, a configuration example and an operation example of a face feature point detection apparatus 1 which performs the face feature point detection proposed by the inventor will be described based on result of the learning processing. Then, an adoptable modification of the configuration of the face feature point detection apparatus 1 will be described. Furthermore, a face feature point detection apparatus 1*a* which performs the learning processing and face attitude estimation necessary to estimate the attitude of the face (face attitude) will be described as an application example of the technique proposed by the inventor.

(Learning Processing)

The learning processing necessary to operate the face feature point detection apparatus 1 will be described below. The learning processing is one which is necessary to be previously performed in order that the face feature point detection apparatus 1 detects the position of the face feature point (hereinafter simply referred to as "feature point") from the face image. The processing necessary to explain a flow of the learning processing, i.e., obtaining face shape model, retina sampling and obtaining error estimation matrix will be described. Then, a specific example of the flow of the learning processing will be described.

(Obtaining Face Shape Model)

Figure 1:
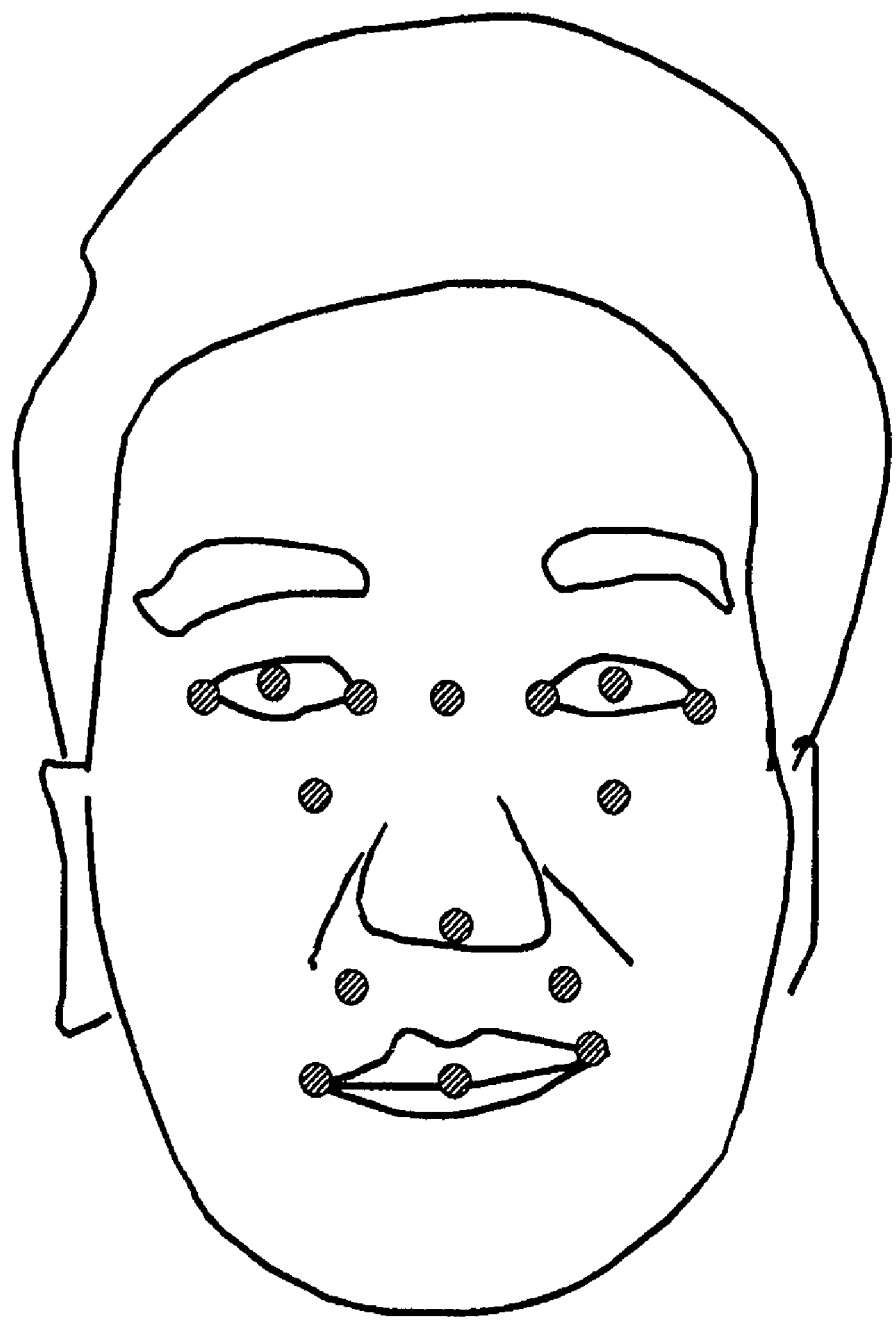
FIG. 1 is a view showing an example of a feature point extracted from a face image.

In the learning processing, plural learning face images (hereinafter referred to as "face image" in the description of the learning processing) are prepared, and the feature point is extracted in each image. In order to enhance accuracy of the learning processing, it is desirable that the learning processing be performed by a human. FIG. 1 is a view showing an example of the feature point extracted from a face image. Referring to FIG. 1, a center position of a circle including an oblique line becomes the feature point. Specifically, examples of the feature point include both ends of eyes (inner corner of eye and tail of eye) and a central portion, right and left cheek bone portions (eye fossa bottom portion), a top of a nose, right and left angles of mouth, a center of a mouth, and an intermediate point between right and left ends of the nose and the right and left angles of mouth. The method disclosed in "Automatic Interpretation and Coding of Face Images Using Flexible Models." may be applied to the extraction of the feature point. It is assumed that $p_i(x_i,y_i)$ is a coordinate of each feature point $p_i$. Where i is a value ranging from 1 to n (n is the number of feature points).

Then, a feature point arrangement vector X for each face image is defined by Formula 1. A feature point arrangement vector for a certain face image j is expressed by $X_j$. The number of dimensions of X is 2n.

$$X=[x_1,y_1,x_2,y_2,\ldots x_n,y_n]^T \quad \text{[Formula 1]}$$

Then, all the obtained feature point arrangement vectors X are normalized based on a proper reference. At this point, the normalization reference may appropriately be determined by a designer. A specific example of the normalization will be described below. For example, assuming that a $p_G$ is a barycenter coordinate of the points $p_1$ to $p_n$ for the feature point arrangement vector $X_j$ of the face image j, the size can be normalized using Lm defined by Formula 2. Specifically, the size can be normalized by dividing a post-movement coordinate value by Lm. Lm is an average of linear distances between a barycenter and the points when each point $p_i$ is moved to a coordinate system whose origin is the barycenter.

$$Lm = \frac{1}{n}\sum_{i=1}^{n}\sqrt{(x_i - x_G)^2 + (y_i - y_G)^2} \quad \text{[Formula 2]}$$

For rotation, the normalization can be achieved by performing rotation conversion to a feature point coordinate such that a straight line connecting centers of eyes becomes horizontal. Because the above processing can be expressed by the combination of the rotation and the scaling, a feature point arrangement vector x can be expressed by Formula 3 after the normalization (similarity transformation).

$$x = sRX + t \quad \text{[Formula 3]}$$

$$\left( sR = \begin{bmatrix} s\cos\theta & -s\sin\theta \\ s\sin\theta & s\cos\theta \end{bmatrix} \right.$$

$$\left. t = \begin{bmatrix} t_x \\ t_y \end{bmatrix} \right)$$

Then, a principal component analysis is performed to a set of normalizing feature point arrangement vectors. For example, the principal component analysis can be performed as follows. A mean vector (mean vector is indicated by a horizontal line on x) is obtained according to Formula 4. In Formula 4, N is the number of face images, i.e., the number of feature point arrangement vectors.

$$\bar{x} = \frac{1}{N}\sum_{j=1}^{N} x_j \quad \text{[Formula 4]}$$

As shown in Formula 5, the mean vector is subtracted from all the normalized feature point arrangement vectors to obtain a differential vector x'. The differential vector for the image j is indicated by $x'_j$.

$$x'_j = x_j - \bar{x} \quad \text{[Formula 5]}$$

2n sets of eigenvectors and eigenvalues are obtained as a result of the principal component analysis. Any normalizing feature point arrangement vector can be expressed by Formula 6.

$$x = \bar{x} + Pb \quad \text{[Formula 6]}$$

Where P is an eigenvector matrix and b is a shape parameter vector. Each value is shown by Formula 7. Where $e_i$ is an eigenvector.

$$P=[e_1,e_2,\ldots,e_{2n}]^T$$

$$b=[b_1,b_2,\ldots,b_{2n}] \quad \text{[Formula 7]}$$

Actually, using the top k-dimensions having the large eigenvalue, any normalizing feature point arrangement vector x can be expressed by approximation as shown in Formula 8. Hereinafter $e_i$ is referred to as i-th principal component in the descending order of the eigenvalue.

$$x = \bar{x} + P'b'$$

$$P'=[e_1,e_2,\ldots,e_k]^T$$

$$b'=[b_1,b_2,\ldots,b_k] \quad \text{[Formula 8]}$$

When the face shape model is actually applied (perform fitting) to the face image, the similarity transformation (parallel translation, rotation, and scaling) is performed to the normalizing feature point arrangement vector x. Assuming that $S_x$, $S_y$, $S_\theta$, and $S_{scale}$ are parameters of the similarity transformation, a model parameter k can be expressed along with the shape parameter by Formula 9.

$$k=[s_x,s_y,s_\theta,s_{scale},b_1,b_2,\ldots,b_k] \qquad \text{[Formula 9]}$$

In the case where the face shape model expressed by the model parameter k is substantially correctly matched with the feature point position on the face image, the parameter is called a correct model parameter in the face image. The determination whether or not the face shape model is correctly matched with the feature point position on the face image is made by a threshold or a criterion which is set by a designer.

(Retina Sampling)

Figure 2:
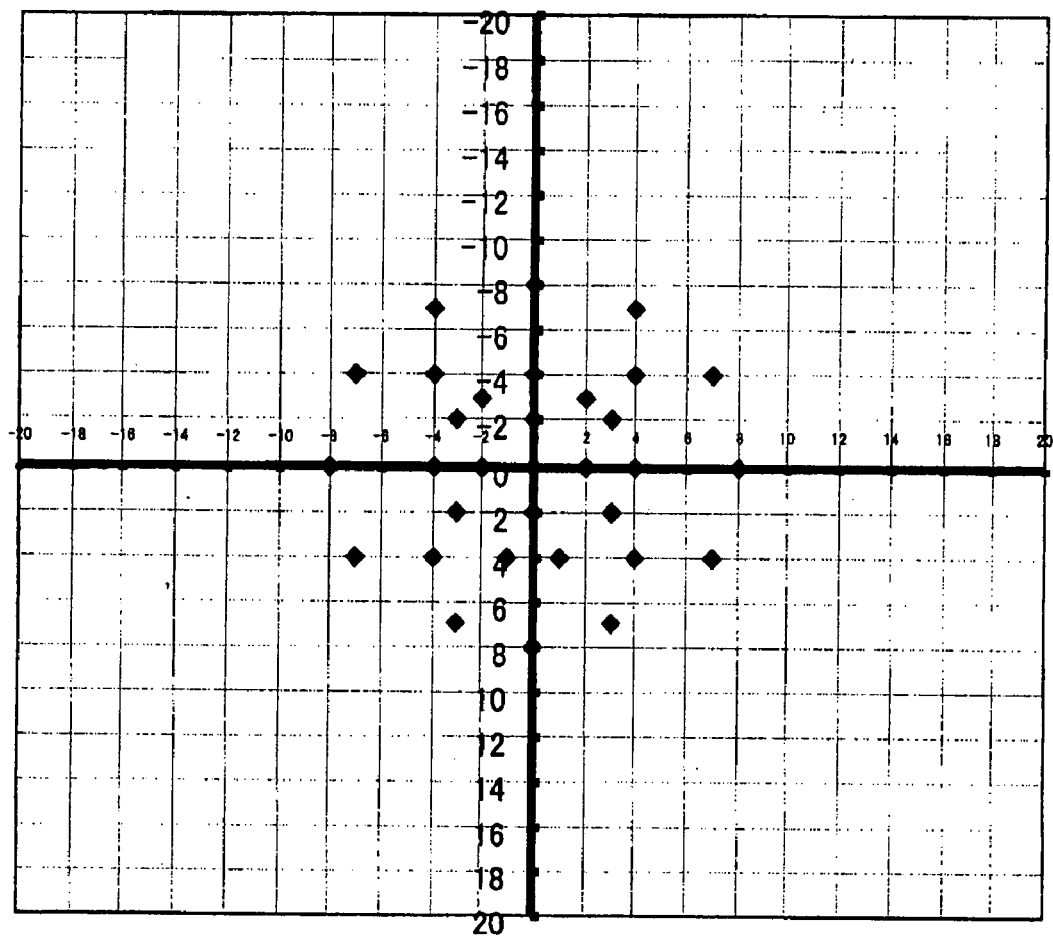
FIG. 2 is a view showing an example of a retina structure.
Figure 3:
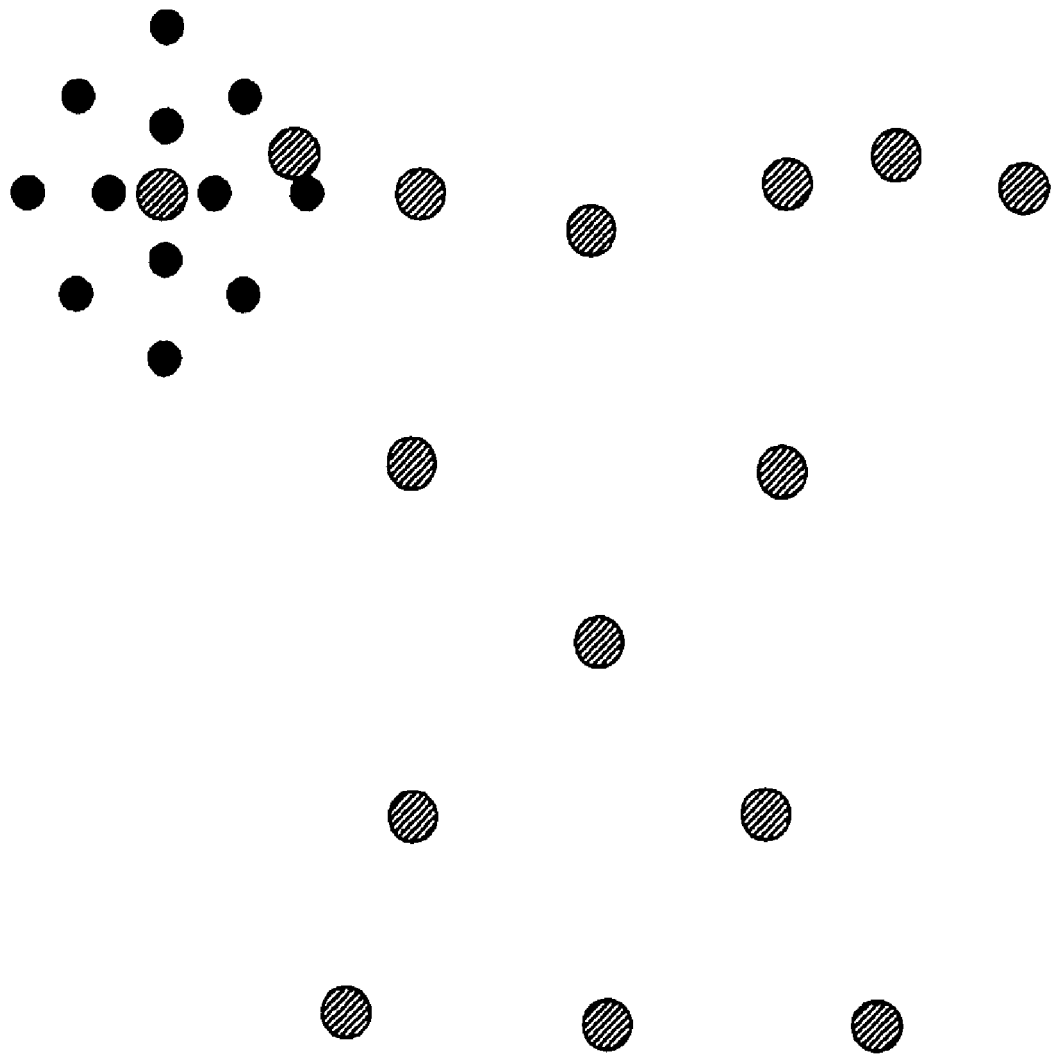
FIG. 3 is a view showing a distribution example of sampling points when the retina structure is applied to one node of a face shape model.

Feature value sampling will now be described. The feature value sampling is performed by the combination of the variable retina structure and the face shape model. The retina structure is one in which sampling points are radially arranged around the feature point (node) to which the attention is paid. FIG. 2 is a view showing an example of the retina structure. In FIG. 2, the coordinate of the feature point to which the attention is paid is an origin, and each point which belongs to another coordinate indicates the sampling point in the retina structure. The information around the feature point can efficiently be sampled in the low dimension by performing the sampling with the retina structure. In the learning processing, the sampling with the retina structure is performed in each node (each point p) of the face shape model. FIG. 3 is a view showing a distribution example of the sampling points when the retina structure is applied to one node of the face shape model. In FIG. 3, a circle including oblique lines indicates the node of the face shape model, and a black circle indicates the sampling pointing in the retina structure.

Assuming that $q_i(x_i,y_i)$ is a coordinate of an i-th sampling point, the retina structure can be expressed by Formula 10.

$$r=[q_1^T,q_2^T,\ldots,q_m^T]^T \qquad \text{[Formula 10]}$$

Accordingly, a retina feature value $f_p$ obtained by performing the sampling with the retina structure to a point $p(x_P,y_P)$ can be expressed by Formula 11. The sampling with the retina structure shall mean that the sampling points are arranged according to the retina structure and the sampling is performed at the arranged sampling point.

$$f_p=[f(p+q_1),\ldots,f(p+q_m)]^T \qquad \text{[Formula 11]}$$

Where f(p) is a feature value at the point p (sampling point p). In each sampling point in the retina structure, the image brightness value, the Sobel filter feature value, the Harr Wavelet feature value, the Gabor Wavelet feature value, or the composite value thereof are obtained as the feature value at the sampling point. In the case of the multi-dimensional feature value, the retina feature value can be expressed by Formula 12.

$$f_p=[f_1(p+q_1^{(1)}),\ldots,f_D(p+q_1^{(D)}),\ldots,f_1(p+q_m^{(1)})\ldots,f_D(p+q_m^{(D)})]^T \qquad \text{[Formula 12]}$$

Where D is the number of dimensions of the feature value and $f_d(p)$ is a d-th dimensional feature value at the point p, and $q_i^{(d)}$ is an i-th sampling coordinate of the retina structure for a d-th dimension.

In the retina structure, the size can be changed according to the scaling of the face shape model. For example the size of the retina structure can be changed in proportion with the parameter $s_{scale}$. At this point, a retina structure r can be expressed by Formula 13. Where α is a proper fixed value. In the retina structure, the rotation or shape deformation may be performed according to other parameters in the face shape model. The retina structure may be set such that the shape (structure) varies according to each node of the face shape model.

$$r=\alpha s_{scale}[q_1^T,q_2^T,\ldots,q_m^T]^T \qquad \text{[Formula 13]}$$

In the face shape model defined by a certain model parameter, a vector in which the retina feature values of the nodes are arranged in line is referred to as sampling feature value f in the face shape model. The sampling feature value f can be expressed as shown in Formula 14. In Formula 14, n is the number of nodes in the face shape model.

$$f=[f_{p1}^T,f_{p2}^T,\ldots,f_{pn}^T]^T \qquad \text{[Formula 14]}$$

In the sampling, the normalization is performed in each node. For example, the normalization may be performed by performing scale conversion such that the feature value falls within a range of 0 to 1. The normalization may be performed by performing the conversion such that an average or a variance is kept constant. Sometimes the normalization is not required depending on the feature value.

(Obtaining Error Estimation Matrix)

The obtaining an error estimation matrix performed in the learning processing will now be described. Obtaining the error estimation matrix is performed with a canonical correlation analysis. The canonical correlation analysis is a technique of determining a correlation between different variates of two dimensions. The learning result about the correlation to which direction correction should be made when the nodes of the face shape model are arranged at the wrong positions (positions different from the feature points to be detected) can be obtained by the canonical correlation analysis.

Figure 4B:
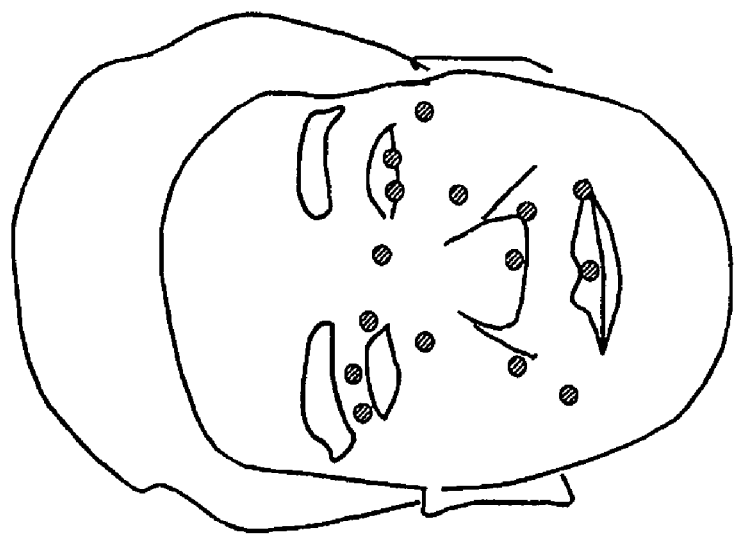
FIG. 4 (comprising FIGS. 4A and 4B) is a view showing an example of a displacement arrangement model.
Figure 4A:
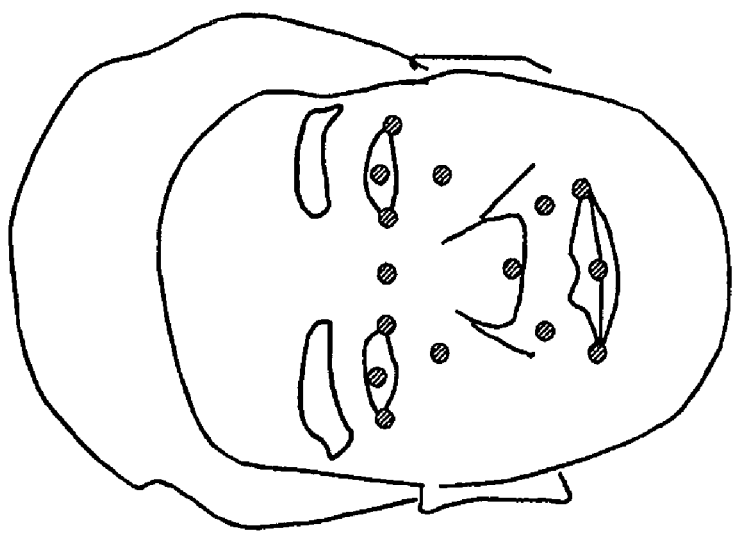

The correct model parameter obtained by the processing in obtaining the face shape model is displaced within a constant range by a random number to produce a displacement arrangement model. FIG. 4 (comprising FIGS. 4A and 4B) is a view showing an example of the displacement arrangement model. In FIG. 4, a circle including oblique lines indicates the node position. FIG. 4A is a view showing the position of each node based on the correct model parameter in a certain face image. FIG. 4B shows an example of the displacement arrangement model which is produced by displacing the correct model (face shape model expressed by the correct model parameter) shown in FIG. 4A. The learning result is obtained for the correlation in the form of a set of the sampling feature value obtained based on the displacement arrangement model and a difference between the displacement arrangement model and the correct model. Specific processing will be described below.

Two sets of variate vectors x and y are defined as shown in Formula 15. x is a sampling feature value for the displacement arrangement model and y is a difference between a correct model parameter ($k_{opt}$) and a displacement arrangement model parameter (parameter indicating the displacement arrangement model: $k_{dif}$).

$$x=[x_1,x_2,\ldots x_p]^T$$

$$y=[y_1,y_2,\ldots y_q]^T=k_{opt}-k_{dif} \qquad \text{[Formula 15]}$$

The two sets of variate vectors are previously normalized into average 0 and variance 1 in each dimension. The parameters (average and variance in each dimension) used for the normalization are required for the later-mentioned face feature point detection processing. Hereinafter the parameters are set to $x_{ave}$, $x_{var}$, $y_{ave}$, and $y_{var}$ are the parameters are referred to as normalized parameter.

When linear conversions for two variates are defined by Formula 16, a and b are determined such that the correlation between u and v is maximized.

$$u = a_1 x_1 + \ldots + a_p x_p = a^T x$$

$$v = b_1 y_1 + \ldots + b_q y_q = b^T y \quad \text{[Formula 16]}$$

In the case where x and y are simultaneously distributed and a variance-covariance matrix Σ thereof is defined by Formula 17, a and b are obtained as an eigenvector for a maximum eigenvalue when a general eigenvalue problem shown in a formula 18 is solved.

$$\Sigma = \begin{bmatrix} \Sigma_{XX} & \Sigma_{XY} \\ \Sigma_{YX} & \Sigma_{YY} \end{bmatrix} \quad \text{[Formula 17]}$$

$$(\Sigma_{XY} \Sigma_{YY}^{-1} \Sigma_{XY} - \lambda^2 \Sigma_{XX}) A = 0$$
$$(\Sigma_{YX} \Sigma_{XX}^{-1} \Sigma_{XY} - \lambda^2 \Sigma_{YY}) B = 0 \quad \text{[Formula 18]}$$

An eigenvalue problem having the lower dimension is solved first in Formula 18. For example, assuming that $\lambda_1$ is the maximum eigenvalue obtained by solving the first equation and $a_1$ is the corresponding eigenvector, the vector $b_1$ is obtained by Formula 19.

$$b_1 = \frac{1}{\lambda_1} \Sigma_{YY}^{-1} \Sigma_{YX} a_1 \quad \text{[Formula 19]}$$

$\lambda_1$ obtained by Formula 19 is referred to as first canonical correlation coefficient. $u_1$ and $v_1$ expressed by Formula 20 are referred to as first canonical variate.

$$u_1 = a_1^T x$$

$$v_1 = b_1^T y \quad \text{[Formula 20]}$$

Then, a second canonical variate corresponding to the second largest eigenvalue, a third canonical variate corresponding to the third largest eigenvalue, and . . . are sequentially obtained based on the size of the eigenvalue. It is assumed that the vector used in the later-mentioned face feature point detection processing is the vector up to an M-th canonical variate in which the eigenvalue is not lower than a constant value (threshold). At this point, the threshold may appropriately be determined by a designer. Hereinafter the conversion vector matrix up to the M-th canonical variate is set to A' and B' and referred to as error estimation matrix. A' and B' can be expressed by Formula 21.

$$A' = [a_1, \ldots, a_M]$$

$$B' = [b_1, \ldots, b_M] \quad \text{[Formula 21]}$$

Generally B' does not become a square matrix. However, because an inverse matrix is required in the face feature point detection processing, a zero vector is added to B' in a pseudo manner to form a square matrix B". The square matrix B" can be expressed by Formula 22.

$$B'' = [b_1, \ldots, b_M, 0, \ldots, 0] \quad \text{[Formula 22]}$$

The error estimation matrix can also be determined by the analytical technique such as the linear regression, the linear multiple regression, and the non-linear multiple regression. However, an influence of the variate corresponding to the small eigenvalue can be neglected using the canonical correlation analysis. Accordingly, the influence of an element which has no influence on the error estimation can be removed to more stably perform the error estimation. Therefore, the error estimation matrix can be obtained not by the canonical correlation analysis but by another analytical technique, unless the above effect is required.

(Flow of Learning Processing)

Figure 5:
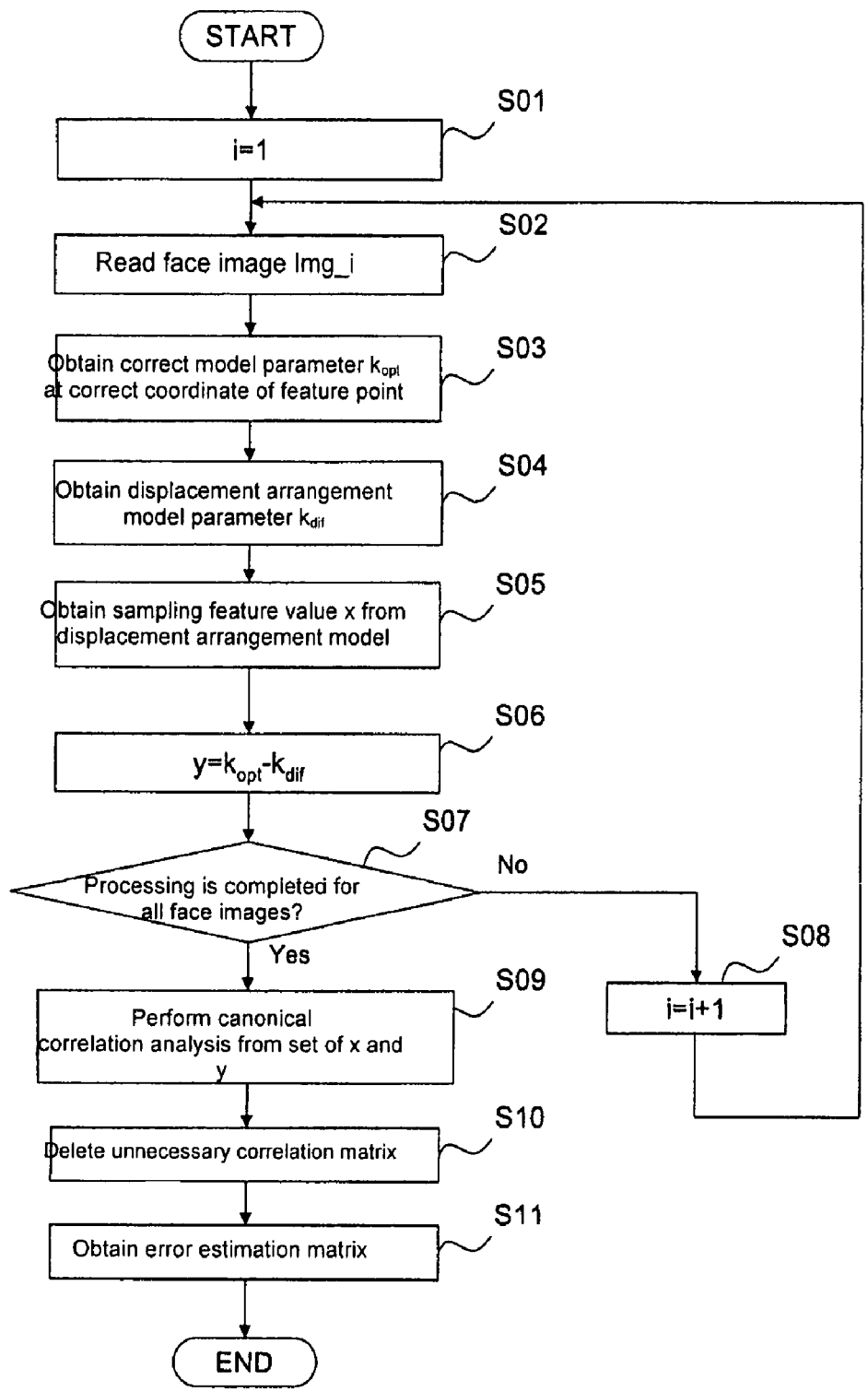
FIG. 5 is a flowchart showing an example of learning processing.

Thus, the three processes, i.e., obtaining the face shape model, the retina sampling, and obtaining the error estimation matrix which are required for the learning processing are described. Then, a flow in performing the learning processing with the processes will be described. FIG. 5 is a flowchart showing an example of the learning processing. An example of the learning processing will be described below with reference to FIG. 5. The following learning processing is performed by the information processing device in which the learning processing program is installed. The information processing device is configured to be able to read the coordinate positions of the feature points (correct coordinate of feature point), previously extracted from the learning face image and each face image, from the connected storage device. In addition to the storage device, the information processing device may be configured to be able to read the data through a network or by accessing a recording medium.

The variable i is defined, and 1 is substituted for i (S01). In the learning face images in which feature point positions are previously obtained, the i-th face image (Img_i) is read (S02). At this point, because 1 is substituted for i, the first face image (Img_1) is read. Then, the set of correct coordinates of the feature points in the face image Img_i is read, and the correct model parameter $k_{opt}$ is obtained to produce the face shape model (S03). Then, the displacement arrangement model parameter $k_{dif}$ is obtained to produce the displacement arrangement model based on the correct model parameter $k_{opt}$ (S04). Then, using the retina structure, the sampling is performed to obtain the sampling feature value x based on the displacement arrangement model (S05). y is obtained based on the correct model parameter $k_{opt}$ and the displacement arrangement model parameter $k_{dif}$ (S06). At this point, it is determined whether or not the processing is completed for all the learning face images (S07). For example, the determination can be made by comparing the value of i to the value of n indicating the number of learning face images. When the unprocessed face image exists (No in S07), the value of i is incremented (S08), and the processes from S02 are performed based on the new value of i. On the other hand, when the processing is completed for all the face images (Yes in S07), the canonical correlation analysis is performed to the set of x and y obtained for each face image (S09). The unnecessary correlation matrix corresponding to the fixed value smaller than the predetermined threshold is deleted (S10), and finally the error estimation matrix is obtained (S11).

(Face Feature Point Detection Apparatus)

A face feature point detection apparatus 1 will be described below. The face feature point detection apparatus 1 detects the feature point from the input face image based on the error estimation matrix and normalized parameter which are obtained by the learning processing. A configuration of the face feature point detection apparatus 1 will first be described.

(Apparatus Configuration)

For example, in a hardware configuration, the face feature point detection apparatus 1 may be configured to include a CPU (Central Processing Unit), a main storage device (RAM), and an auxiliary storage device which are connected through a bus. In this case, the program is executed by the CPU, which allows the face feature point detection apparatus 1 to be realized. As used herein, the auxiliary storage device shall be formed by a nonvolatile storage device. Examples of the nonvolatile storage device include a so-called ROM (Read-Only Memory such as EPROM (Erasable Programmable Read-Only Memory), EEPROM (Electrically Erasable Programmable Read-Only Memory), and mask ROM), FRAM (Ferroelectric RAM), and a hard disk.

Figure 6:
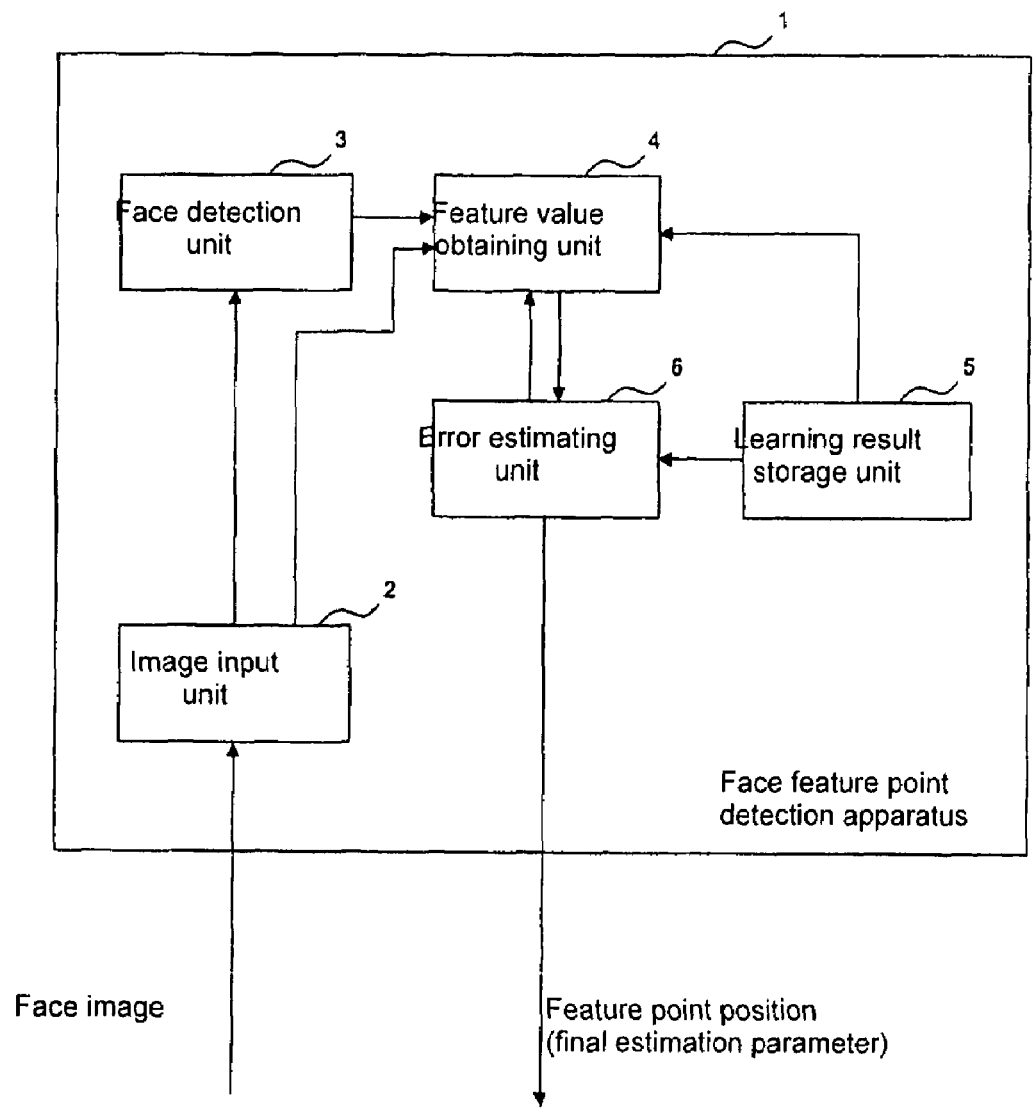
FIG. 6 is a view showing an example of a functional block of a face feature point detection apparatus.

FIG. 6 is a view showing an example of a functional block of the face feature point detection apparatus 1. The face feature point detection apparatus 1 functions as an apparatus including an image input unit 2, a face detection processing 3, a feature value obtaining unit 4, a learning result storage unit 5, and an error estimating unit 6 in such a manner that various programs (OS, applications, and the like) stored in the auxiliary storage device is loaded by the main storage device and executed by CPU. The whole or a part of the face feature point detection apparatus 1 may be formed as a dedicated chip. Then, functional units included in the face feature point detection apparatus 1 will be described.

The image input unit 2 functions as an interface which inputs face image data to the face feature point detection apparatus 1. The face image data is input to the face feature point detection apparatus 1 by the image input unit 2. The image input unit 2 may be formed using any conventional technique of inputting the face image data to the face feature point detection apparatus 1.

For example, the face image data may be input to the face feature point detection apparatus 1 through the network (for example, local area network or the Internet). In such cases, the image input unit 2 is formed using a network interface. The face image data may be input to the face feature point detection apparatus 1 from a digital camera, a scanner, a personal computer, a recording device (for example, hard disk drive), and the like. In such cases, the image input unit 2 is formed pursuant to a standard (for example, wired connection such as USB (Universal Serial Bus) and SCSI (Small Computer System Interface) and wireless connection such as Bluetooth (registered trademark)) which connects the face feature point detection apparatus 1 and the digital camera, the personal computer, the recording device, and the like while data communication can be conducted. The face image data recorded in the recording medium (such as various flash memories, floppy disk (registered trademark), CD (Compact Disk), and DVD (Digital Versatile Disc, Digital Video Disc)) may be input to the face feature point detection apparatus 1. In such cases, the image input unit 2 is formed using a device (for example, a flash memory reader and a floppy disk (registered trademark) drive, a CD drive, and a DVD drive) which reads the data from the recording medium.

The face feature point detection apparatus 1 may be incorporated into various instruments (for example, Personal Digital Assistant (PDA) and a portable telephone) including the imaging device such as the digital camera, and the taken image may be input in the form of the face image data to the face feature point detection apparatus 1. In such cases, the image input unit 2 may be formed using CCD (Charge-Coupled Devices) or a CMOS (Complementary Metal-Oxide Semiconductor) sensor, or the image input unit 2 may be formed as the interface which inputs the face image data taken by CCD or the CMOS sensor to a face detection device 4a. The face feature point detection apparatus 1 may be incorporated into an image output device such as a printer and a display, and the image input as the output data to the image output device may be input the face feature point detection apparatus 1. In such cases, the image input unit 2 is formed using a device for converting the face image data input to the image output device into the data which can be dealt with in the face feature point detection apparatus 1.

The image input unit 2 may be formed to be able to correspond to the plural cases.

The face detection unit 3 detects the human face from the face image input through the image input unit 2. The face detection unit 3 may be formed to detect the face with template matching in which a reference template corresponding to an outline of the whole face is used. The face detection unit 3 may be formed to detect the face with template matching based on components (such as eye, nose, and ear) of the face. The face detection unit 3 may be formed to detect a top of the head by chroma key processing, and the face detection unit 3 detects the face based on the top of the head. The face detection unit 3 may be formed to detect an area whose color is close to a skin color, and the face detection unit 3 detects the area as the face. The face detection unit 3 may be formed to perform the learning with a teacher signal through a neural network, and to detect a face-like area as the face. The face detection processing performed by the face detection unit 3 may be realized by applying conventional techniques.

The face detection unit 3 specifies the position of the detected face, and the face detection unit 3 transfers the position to the feature value obtaining unit 4. The face detection unit 3 may be configured to obtain an inclination of the face and the size of the face and to transfer the value thereof to the feature value obtaining unit 4.

The feature value obtaining unit 4 obtains the sampling feature value from the image of the human face detected by the face detection unit 3. The specific processing performed by the feature value obtaining unit 4 will be described below.

When the feature value obtaining unit 4 initially obtains the sampling feature value for the face detected by the face detection unit 3, the feature value obtaining unit 4 arranges the face shape model defined by the initial parameter $k_{init}$ at the initial position of the detected face. The initial position may be a position where the center of the detected face is matched with the center of the face shape model. When the face detection unit 3 obtains a face rectangle (rectangle surrounding the detected face), the initial position may be a position where a predetermined node of the face shape model is arranged in a range of the top (for example, an upper left corner) of the face rectangle to a predetermined position. The initial position may be defined in any way by a designer as long as the face shape model is properly arranged to the detected face.

The initial parameter $k_{init}$ shall mean the model parameter expressed by the initial value in the model parameters k expressed by Formula 9. A proper value may be set to the initial parameter $k_{init}$. However, various orientations of the face and the expression change can be dealt with by setting an average value obtained from a general face image to the initial parameter $k_{init}$. Accordingly, the average value of the correct model parameter of the face image used in the learning processing may be used as the parameters $S_x$, $S_y$, $S_\theta$, and $S_{scale}$ of the similarity transformation. For example, the shape parameter b may be set to zero. When the face detection unit 3 obtains the information on the orientation of the face, the initial parameter may be set using the information on the orientation of the face. Additionally another value which is empirically obtained by a designer may be used as the initial parameter.

Then, on the basis of the retina structure, the feature value obtaining unit 4 performs the sampling to the face shape model expressed by the set initial parameter, and the feature value obtaining unit 4 obtains the sampling feature value f. The feature value obtaining unit 4 transfers the obtained sampling feature value f to the error estimating unit 6.

On the other hand, when the feature value obtaining unit 4 obtains sampling feature value for the face detected by the face detection unit 3 for the second time or more, the feature value obtaining unit 4 obtains the sampling feature value f for the face shape model which is expressed by the new model parameter k (i.e., estimate $k_{i+1}$ of the correct model parameter) obtained by the error estimating unit 6. In this case, the feature value obtaining unit 4 also transfers the obtained sampling feature value f to the error estimating unit 6.

The learning result storage unit 5 is formed by using the nonvolatile storage device, and the learning result obtained by the learning processing is stored in the learning result storage unit 5. Specifically, the error estimation matrix and the normalized parameter are stored in the learning result storage unit 5. A part of the values (for example, average value of the similarity transformation parameter in the correct model parameter of the face image used in the learning processing) constituting the initial parameter $k_{init}$ or the initial parameter $k_{init}$ may further be stored in the learning result storage unit 5 if needed.

The error estimating unit 6 estimates an error amount to obtain the new model parameter k based on the sampling feature value f obtained by the feature value obtaining unit 4 and the error estimation matrix or normalized parameter which is stored in the learning result storage unit 5. A specific processing example of the error estimating unit 6 will be described below.

Using the normalized parameter $(x_{ave}, x_{var})$, the error estimating unit 6 normalizes the sampling feature value f obtained by the feature value obtaining unit 4, and the error estimating unit 6 obtains the vector x to perform the canonical correlation analysis. The error estimating unit 6 computes the first to M-th canonical variates based on Formula 23, and thereby the error estimating unit 6 obtains the variate u.

$$u = [u_1, \ldots, u_M]^T = A'^T x$$ [Formula 23]

Then, the error estimating unit 6 obtains the normalized error estimator $y_{err}$ using Formula 24. In Formula 24, u' is a vector in which zero is added to u so as to become the same dimension as B''.

$$y_{err} = B''^{T-1} u'$$ [Formula 24]

Then, the error estimating unit 6 performs restoration processing to the normalized error estimator $y_{err}$ to obtain the error estimator $k_{err}$ using the normalized parameter $(y_{ave}, y_{var})$. The error estimator $k_{err}$ is an error estimator ranging from the current model parameter $k_i$ to the correct model parameter $k_{opt}$. Accordingly, the estimate $k_{i+1}$ of the correct model parameter can be obtained by adding the error estimator $k_{err}$ to the current model parameter $k_i$. However, the error estimator $k_{err}$ possibly includes an error. Therefore, in order to perform more stably the detection, the estimate $k_{i+1}$ of the correct model parameter can be obtained by Formula 25. In Formula 25, σ is a proper fixed value, and σ may appropriately be determined by a designer. σ may be changed depending on the change of i.

$$k_{i+1} = k_i + \frac{k_{err}}{\sigma}$$ [Formula 25]

Then, the error estimating unit 6 performs end determination. For example, when the value of i exceeds the threshold, the error estimating unit 6 may determine that the processing is ended. For example, the error estimating unit 6 may determine that the processing is ended when a value of Δk expressed by Formula 26 becomes the threshold or less. The error estimating unit 6 may perform the end determination based on whether or not the obtained value of $k_{i+1}$ falls within the normal range. For example, when the obtained value of $k_{i+1}$ does not clearly indicate the correct position in the image of the human face, the error estimating unit 6 may output an error to determine that the processing is ended. When a part of the node expressed by the obtained value of $k_{i+1}$ runs over the image of the processing target, the error estimating unit 6 may also output an error to determine that the processing is ended.

$$\Delta k = k_{i+1} - k_i$$ [Formula 26]

When the error estimating unit 6 determines that the processing is continued, the error estimating unit 6 transfers the estimate $k_{i+1}$ of the obtained correct model parameter to the feature value obtaining unit 4. On the other hand, when the error estimating unit 6 determines that the processing is ended, the error estimating unit 6 outputs the estimate $k_i$ (or $k_{i+1}$) of the correct model parameter obtained at that time as the final estimation parameter $k_{est}$.

OPERATION EXAMPLE

Figure 7:
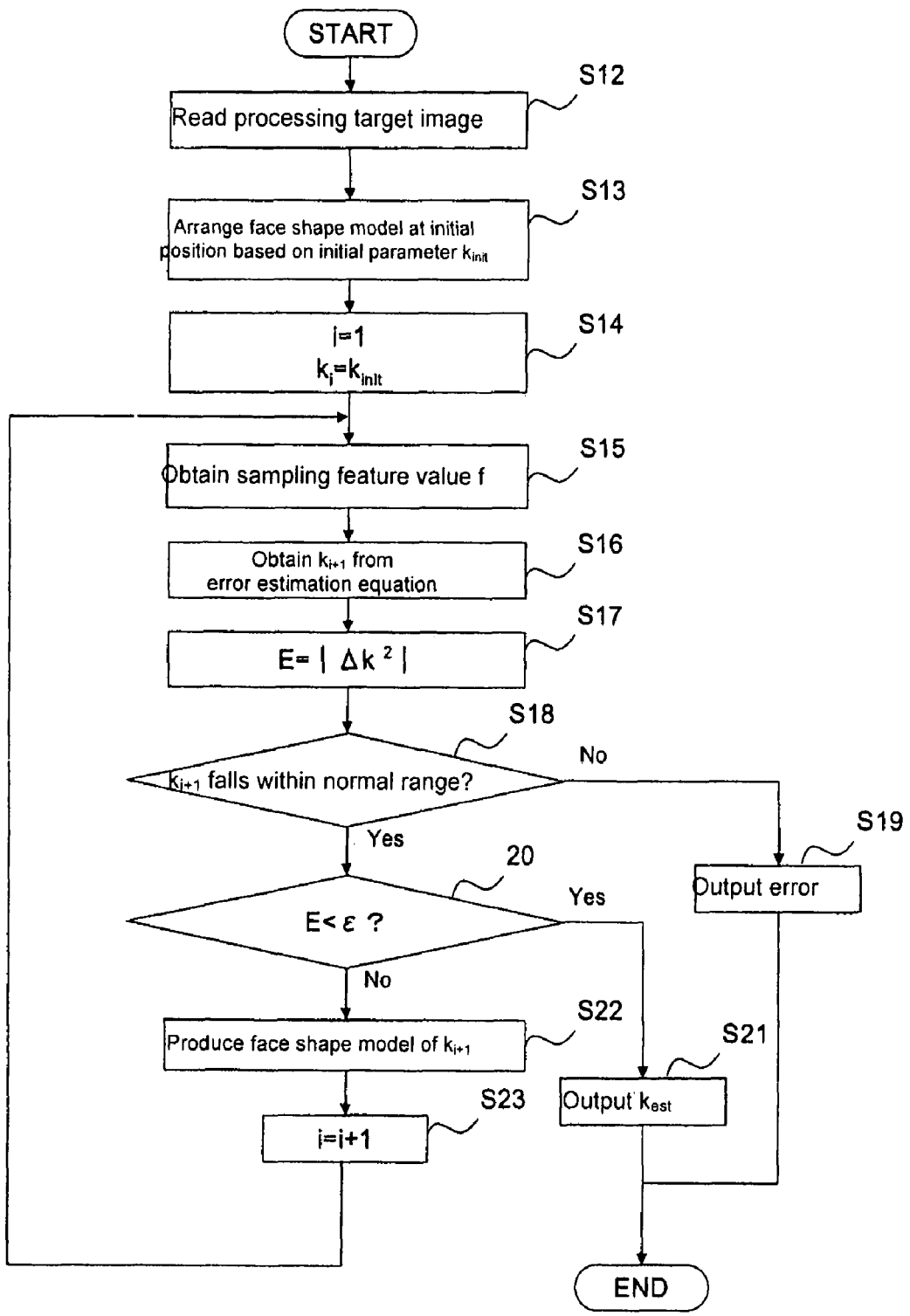
FIG. 7 is a flowchart showing an operation example of the face feature point detection apparatus.

FIG. 7 is a flowchart showing an operation example of the face feature point detection apparatus 1. An operation example of the face feature point detection apparatus 1 will be described below with reference to FIG. 7. The face feature point detection apparatus 1 reads the image which becomes the processing target through the image input unit 2 (S12). The face detection unit 3 detects the human face from the image which becomes the processing target. Then, the feature value obtaining unit 4 arranges the face shape model based on the initial parameter $k_{init}$ at the initial position which is obtained according to the result of the face detection processing performed by the face detection unit 3 (S13). Then, the feature value obtaining unit 4 defines the variable i to substitute 1 for i, and the feature value obtaining unit 4 defines $k_i$ to substitute the initial parameter $k_{init}$ for $k_i$ (S14). On the basis of the retina structure, the feature value obtaining unit 4 obtains the sampling feature value f according to $k_i$ (S15).

The error estimating unit 6 obtains the estimate $k_{i+1}$ of the correct model parameter based on the obtained sampling feature value f or the error estimation equation stored in the learning result storage unit 5 (S16). Then, the error estimating unit 6 squares Δk to take an absolute value of the squared Δk, and thereby the error estimating unit 6 obtains E (S17). Then, the error estimating unit 6 performs the end determination.

In the end determination, the error estimating unit 6 determines whether or not the obtained value of $k_{i+1}$ falls within the normal range (S18). When the value of $k_{i+1}$ does not fall within the normal range (No in S18), the error estimating unit 6 outputs an error to an output device (not shown) (S19), and the processing as the face feature point detection apparatus 1 is ended. On the other hand, when the obtained value of $k_{i+1}$ falls within the normal range (Yes in S18), it is determined whether or not the value of E obtained in S17 exceeds a threshold (ε) (S20). When the value of E does not exceed the threshold (Yes in S20), the error estimating unit 6 determines that the processing is caused to converge, and the error estimating unit 6 outputs $k_{est}$ (S21). Then, the processing as the face feature point detection apparatus 1 is ended.

On the other hand, when the value of E exceeds the threshold (No in S20), the error estimating unit 6 transfers the value of $k_{i+1}$ to the feature value obtaining unit 4. The feature value obtaining unit 4 produces the new face shape model based on the value of $k_{i+1}$ (S22). Then, the error estimating unit 6 increments the value of i (S23). The feature value obtaining unit 4 obtains the sampling feature value f based on the new face shape model. That is, in this case, the processes from S15 are repeated based on the new face shape model.

(Action and Effect)

In the conventional ASM, it is necessary that the searching processing is repeated around each node of the face shape model. Additionally, in the conventional AAM, it is necessary that the homogeneous and high-density sampling is performed in the patch formed by the nodes, and it is necessary that the shape correction processing is performed to the result of the homogeneous and high-density sampling. Specifically, in the conventional AAM, usually the sampling is required for at least ten thousand times. That is, in the conventional technique, the computation amount is not sufficiently reduced although the high processing speed and high-speed response are required for the face feature point detection processing.

On the other hand, the shape correction processing is not required in the face feature point detection apparatus 1. Additionally, in the face feature point detection apparatus 1, the feature point detection processing is performed by the inhomogeneous and low-density sampling based on the retina structure. Specifically, usually the feature point detection processing can be performed by sampling several hundred times. Thus, according to the face feature point detection apparatus 1, the computation amount necessary to detect the feature point can largely reduced compared with the conventional technique.

(Modification)

The initial parameter $k_{init}$ indicating the states of the plural faces may previously be stored in the learning result storage unit 5. For example, the value of the initial parameter $k_{init}$ corresponding to the horizontally orientated face or the upwardly orientated face may be stored in the learning result storage unit 5. The feature value obtaining unit 4 may change the face shape model used depending on the obtained value of $k_{i+1}$. Specifically, the feature value obtaining unit 4 cancels the value of $k_{i+1}$ depending on the value of $k_{i+1}$ newly obtained by the error estimating unit 6, the feature value obtaining unit 4 reads another initial parameter $k_{init}$ different from the initial parameter $k_{init}$ used from the learning result storage unit 5, and the feature value obtaining unit 4 may be configured to perform the processes from S13 again based on another initial parameter $k_{init}$. When the face feature point detection processing is repeatedly performed, the feature value obtaining unit 4 may change the initial parameter used in the detection processing performed to the face image which is input next according to the value of $k_{est}$ obtained at some time in time. When the face included in the image which becomes the processing target is horizontally orientated, sometimes the high-accuracy result is obtained by performing the processing not with the initial parameter $k_{init}$ indicating the face shape model of the frontward-orientated face but with the initial parameter $k_{init}$ indicating the face shape model of the horizontally-orientated face. Accordingly, in such cases, the effective configuration is obtained by the above modification. The feature value obtaining unit 4 may be configured to switch not the initial parameter $k_{init}$ but the retina structure or the error estimation matrix.

The error estimating unit 6 may output the value of $k_{i+1}$ obtained at some point in time as $k_{est}$ without performing the end determination.

The face feature point detection apparatus 1 may be configured without including the face detection unit 3. In such cases, the feature value obtaining unit 4 may be configured to perform the processing while the center of the screen is set to the initial position. The face detection unit 3 is provided outside the face feature point detection apparatus 1, and the information on the position of the face detected along with the face image may be input to the face feature point detection apparatus 1.

The face detection unit 3 may be configured to detect the human eyes, mouth, or other feature points, rather than the human face. In such cases, the feature value obtaining unit 4 may be configured to determine the initial position based on the feature point positions of the human eyes, mouth, or other feature points.

The feature value obtaining unit 4 may arrange the sampling points based on a structure other than the retina structure.

(Learning Processing for Face Attitude Estimation)

Then, learning processing for face attitude estimation will be described. The face attitude estimation shall mean processing in which the face attitude of the face included in the image of the processing target is estimated while the feature point position is detected. The face attitude shall mean the orientation of the face or an angle of the face.

(Attitude Correlation Learning)

The error estimation matrix obtaining processing necessary to detect the face feature point is described in the above section of "learning processing". In the following section, learning processing (attitude correlation learning) for the attitude estimation processing will be described. The attitude estimation processing is performed in order not to detect the face feature point, but in order to estimate the face attitude of the person of the face image.

There is a correlation between the correct model parameter $k_{opt}$ and a correct face attitude parameter $g_{opt}$ of the face image. The correlation can be determined as follows by utilizing the canonical correlation analysis. The correct face attitude parameter $g_{opt}$ is defined by Formula 27. At this point, the face attitude parameter is expressed by rotation angles in the x, y, and z-axes of the face. The face attitude parameter may be expressed by other values.

$$g_{opt} = [\theta_x, \theta_y, \theta_z]^T \quad \text{[Formula 27]}$$

For the plural learning face images, two sets of variate vectors are defined as $x = k_{opt}^T$ and $y = g_{opt}$. $g_{opt}$ is a face attitude parameter in the correct face attitude. The variate vectors are previously normalized into average 0 and variance 1 in each dimension. Then, as with the description of "learning processing", the conversion vector pair up to the L-th canonical variate is obtained by performing the canonical correlation analysis. Formula 28 indicates the conversion vector pair obtained by the processing. Where L is a positive integer, and L is a value determined by a designer. At this point, the normalized parameter is recorded.

$$(a_1^{pose}, b_1^{pose}), \ldots, (a_L^{pose}, b_L^{pose}) \quad \text{[Formula 28]}$$

Then, the conversion vector matrix up to the L-th canonical variate is obtained as $A'_{pose}$ and $B'_{pose}$. Hereinafter the obtained two conversion vector matrices are referred to as attitude estimating matrix. $A'_{pose}$ and $B''_{pose}$ obtained by converting $B'_{pose}$ into the square matrix are shown in Formula 29.

$$A'_{pose} = [a_1^{pose}, \ldots, a_L^{pose}]$$

$$B''_{pose} = [b_1^{pose}, \ldots, b_L^{pose}, 0, \ldots, 0] \quad \text{[Formula 29]}$$

It is not always necessary to use all the values included in the model parameter k. For example, because $s_{scale}$ corresponding to the scaling has no relationship with the face attitude, the computation can be simplified by previously neglecting the value of $s_{scale}$.

The attitude estimating matrix can be determined by applying the analytical techniques such as the linear regression, the linear multiple regression, and the non-linear multiple regression.

(Flow of Attitude Correlation Learning)

Figure 8:
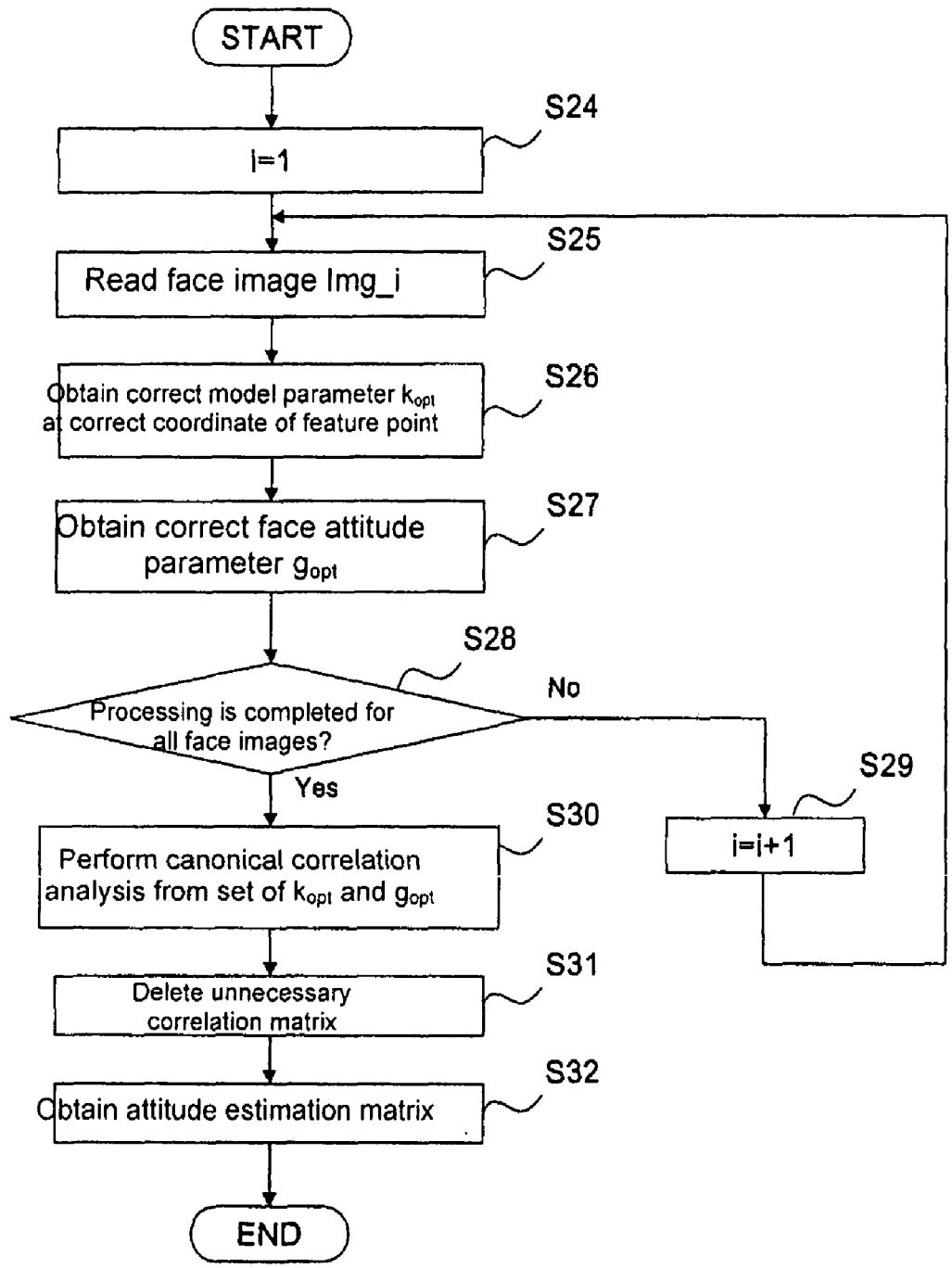
FIG. 8 is a flowchart showing an flow example of attitude correlation learning.

An example of the attitude estimating matrix obtaining processing will now be described with reference to a flowchart. FIG. 8 is a flowchart showing an example of the attitude estimating matrix obtaining processing, i.e., an example of attitude correlation learning processing. The following processing is performed by the information processing device in which an attitude correlation learning processing program is installed. The information processing device is configured to be able to read the coordinate positions (correct coordinate of feature point) of the feature points, previously extracted in the learning face image and each face image, from the connected storage device. In addition to the storage device, the information processing device may be configured to be able to read the data through the network or by accessing the recording medium.

The variable i is defined, and 1 is substituted for i (S24). In the learning face images in which the feature point positions are previously obtained, the i-th face image (Img_i) is read (S25). At this point, because 1 is substituted for i, the first face image (Img_1) is read. Then, the set of correct coordinates of the feature points in the face image Img_i is read, and the correct model parameter $k_{opt}$ is obtained to produce the face shape model (S26). Then, the correct face attitude parameter $g_{opt}$ is obtained (S27), and it is determined whether or not the processes from S25 to S27 are completed for all the learning face images (S28). For example, the determination can be made by comparing the value of i to the value of n indicating the number of learning face images. When the unprocessed face image exists (No in S28), the value of i is incremented (S29), and the processes from S25 are performed based on the new value of i. On the other hand, when it is determined that the processing is completed for all the face images (Yes in S28), the canonical correlation analysis is performed to the set of $k_{opt}$ and $g_{opt}$ obtained for each face image (S30). The unnecessary correlation matrix corresponding to the fixed value smaller than the predetermined threshold is deleted (S31), and finally the error estimation matrix is obtained (S32).

(Face Feature Point Detection Apparatus for Performing Face Attitude Estimation)

Figure 9:
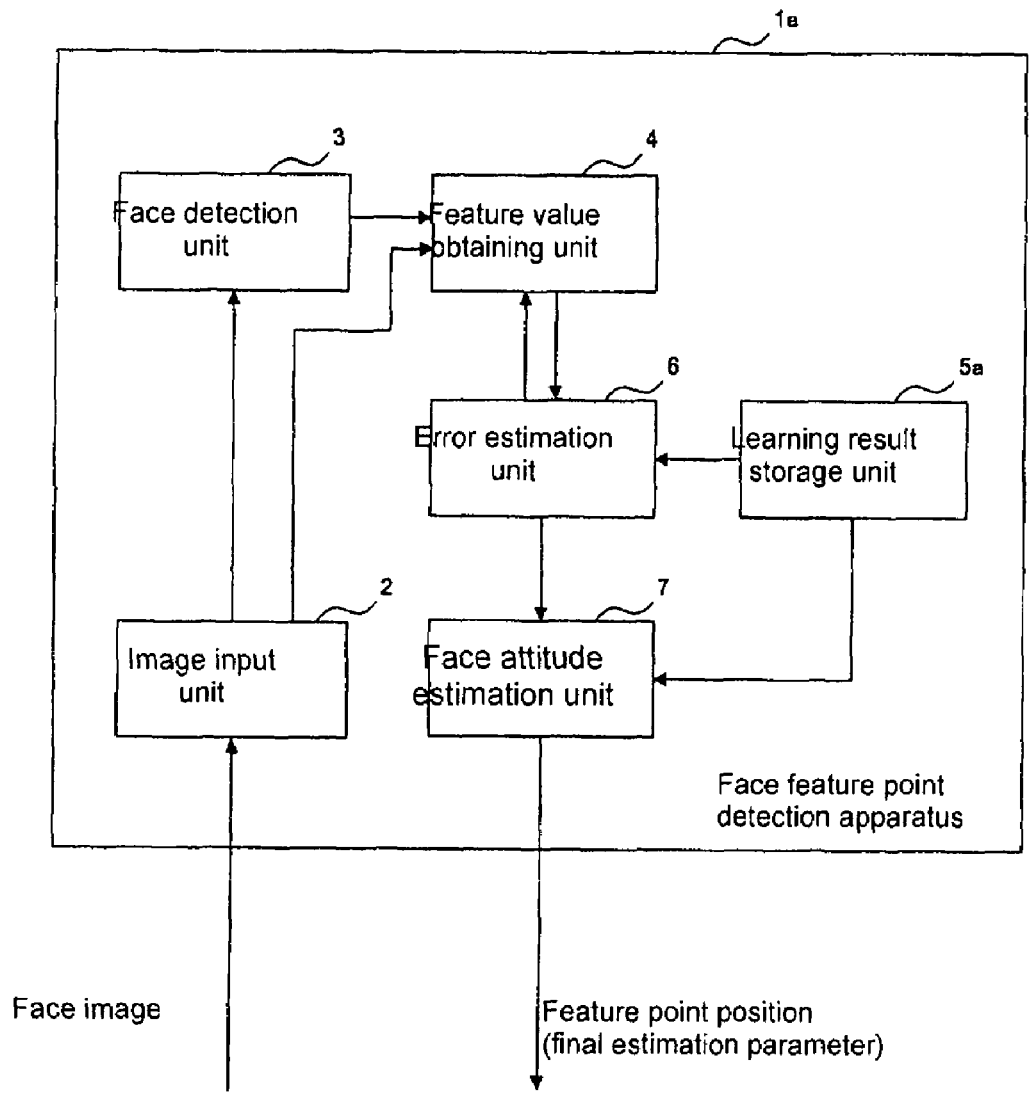
FIG. 9 is a view showing an example of a functional block of a face feature point detection apparatus.

FIG. 9 is a view showing an example of a functional block of a face feature point detection apparatus 1a. The face feature point detection apparatus 1a differs from the face feature point detection apparatus 1 in that the face attitude is further estimated. In order to introduce the action, the face feature point detection apparatus 1a further includes a face attitude estimating unit 7. The face feature point detection apparatus 1a also includes a learning result storage unit 5a in place of the learning result storage unit 5. Because other functional units included in the face feature point detection apparatus 1a are similar to those included in the face feature point detection apparatus 1, the description is neglected.

The learning result storage unit 5a differs from the learning result storage unit 5 in that the learning result obtained by the attitude correlation learning is further stored in the learning result storage unit 5a. The learning result obtained by the attitude correlation learning shall mean for example the attitude estimating matrix and the normalized parameter used in the learning processing. Except for the above point, the learning result storage unit 5a may be configured in the same way as the learning result storage unit 5.

The face attitude estimating unit 7 obtains $k_{est}$ from the error estimating unit 6 to estimate the face attitude. First the face attitude estimating unit 7 normalizes $k_{est}$ using the normalized parameter obtained in the attitude correlation learning, and the face attitude estimating unit 7 obtains the vector $x_{pose}$ used in the canonical correlation analysis. Then, the face attitude estimating unit 7 performs the computation up to the L-th canonical variate using Formula 30.

$$u_{pose} = A'^T_{pose} x_{pose} \quad \text{[Formula 30]}$$

Then, the face attitude estimating unit 7 computes the normalized attitude estimator $y_{pose}$ using Formula 31. In Formula 31, $u'_{pose}$ is a vector in which zero is added to $u_{pose}$ so as to become the same dimension as $B''_{pose}$.

$$y_{pose} = B''_{pose} T^{-1} u'_{pose} \quad \text{[Formula 31]}$$

Then, the face attitude estimating unit 7 performs normalization restoration processing to the normalized attitude estimator $y_{pose}$ to obtain the attitude estimator $g_{est}$. In the normalization restoration processing, the face attitude estimating unit 7 uses the normalized parameter obtained in the attitude correlation learning.

(Action and Effect)

According to the face feature point detection apparatus 1a having the above configuration, the face attitude of the human face in the input image can be detected based on $k_{est}$ obtained by the error estimating unit 6. For example, the face feature point detection apparatus 1a is effectively applied to a drowsy driving detection apparatus necessary to detect the face attitude of a driver.

(Modification)

The face attitude estimating unit 7 may be configured to obtain the attitude estimator gi in each value of i using not $k_{est}$ finally obtained from the error estimating unit 6 but the value of $k_i$ obtained in each value of i. The face attitude estimating unit 7 may be configured to finally obtain the attitude estimator $g_{est}$ using the value of $k_{est}$.

As with the modification of the face feature point detection apparatus 1, the initial parameter $k_{init}$ indicating the states of the plural faces may previously be stored in the learning result storage unit 5a. For example, the value of the initial parameter $k_{init}$ corresponding to the horizontally orientated face or the upwardly orientated face may be stored in the learning result storage unit 5a. The feature value obtaining unit 4 may change the face shape model used depending on the obtained value of $k_{i+1}$. Specifically, the feature value obtaining unit 4 cancels the value of $k_{i+1}$ depending on the value of $k_{i+1}$ newly obtained by the error estimating unit 6 or the attitude estimator gi newly obtained by the face attitude estimating unit 7, the feature value obtaining unit 4 reads another initial parameter $k_{init}$ different from the initial parameter $k_{init}$ used from the learning result storage unit 5, and the feature value obtaining unit 4 may be configured to perform the processes from S13 again based on another initial parameter $k_{init}$. When the face feature point detection processing is repeatedly performed, the feature value obtaining unit 4 may change the initial parameter used in the detection processing performed to the face image which is input next according to the value of $k_{est}$ or $g_{est}$ obtained at some time in time. When the face included in the image which becomes the processing target is horizontally orientated, sometimes the high-accuracy result is obtained by performing the processing not with the initial parameter $k_{init}$ indicating the face shape model of the frontward-orientated face but with the initial parameter $k_{init}$ indicating the face shape model of the horizontally-orientated face.

Accordingly, in such cases, the effective configuration is obtained by the above modification. The feature value obtaining unit 4 may be configured to switch not the initial parameter $k_{init}$ but the retina structure or the error estimation matrix, or the feature value obtaining unit 4 may be configured to switch the retina structure or the error estimation matrix in addition to the initial parameter $k_{init}$.

This application claims priority to Patent Application No. PCT/JP2004/16889, filed Nov. 12, 2004, which is hereby incorporated by reference.

While the invention has been described above with respect to a series of examples, those skilled in the art, having benefit of this disclosure, will appreciate that other embodiments can be devised which do not depart from the scope of the invention as disclosed herein. Further, it should be appreciated that the various embodiments described above may be combined. Accordingly, the scope of the invention should be limited only by the attached claims.

The invention claimed is:

1. A face feature point detection apparatus comprising:
arrangement means for arranging a plurality of nodes at predetermined initial positions of an input image, the plurality of nodes corresponding to a plurality of feature points in a human face;
feature value obtaining means for obtaining feature values at a plurality of sampling points as a node feature value of each corresponding node by arranging said plurality of sampling points around each node arranged by said arrangement means;
storage means in which feature values of a plurality of nodes arranged at positions displaced from correct positions of the corresponding feature points in a learning image and correlation information on a difference between said correct position in each node and the position displaced from said correct position are previously stored;
error estimator obtaining means for obtaining an error estimator indicating a displacement between the current position of each node and the position of the corresponding feature point based on said correlation information stored in said storage means and the node feature value of each node, the node feature value of each node being obtained by said feature value obtaining means; and
estimation means for estimating the position of each feature point in the input image based on said error estimator obtained by said error estimator obtaining means and the current position of each node.

2. The face feature point detection apparatus according to claim 1, further comprising end determination means for determining end of repetitive processing,
wherein said arrangement means moves the current position of each node based on the error estimator when said error estimator is obtained,
said arrangement means and said error estimator obtaining means perform the repetitive processing, and
said estimation means estimates the position of each feature point in the input image based on the error estimator at a point in time when said end determination means determines an end of repetitive processing and the position of each node.

3. The face feature point detection apparatus according to claim 2, wherein said end determination means determines an end of repetitive processing when the error estimator obtained by said error estimator obtaining means becomes equal to or less than a threshold.

4. The face feature point detection apparatus according to claim 1, further comprising face detection means for detecting at least a human face or a position of an element of the human face from said input image,
wherein said arrangement means determines an initial position of said each node based on said detected human face or said detected position of the element of the human face.

5. The face feature point detection apparatus according to claim 4, wherein said face detection means further detects an orientation of the human face, and
said arrangement means has a node model in which a relative positional relationship among nodes is defined, and said arrangement means uses the node model while the node model is deformed based on the orientation of the face detected by said face detection means when each node is arranged at said initial position based on said node model.

6. The face feature point detection apparatus according to claim 4, wherein said face detection means further detects a size of the human face, and
said arrangement means has a node model in which a relative positional relationship among nodes is defined, and said arrangement means uses the node model while the node model is deformed based on the size of the face detected by said face detection means when each node is arranged at said initial position based on said node model.

7. The face feature point detection apparatus according to claim 4, wherein said face detection means further detects an orientation of the human face,
said arrangement means has a plurality of node models according to the orientation of the face, a relative positional relationship among nodes being defined in the node model,
said storage means stores said correlation information corresponding to each node model previously obtained with said learning image in which each face of the corresponding orientation is taken,
said arrangement means selects the node model used based on the orientation of the face detected by said face detection means when each node is arranged at said initial position based on said node model, and
said error estimator obtaining means reads and uses said correlation information from said storage means, said correlation information corresponding to the node model selected by said arrangement means.

8. The face feature point detection apparatus according to claim 4, wherein said face detection means further detects a size of the human face,
said arrangement means has a plurality of node models according to the size of the face, a relative positional relationship among nodes being defined in the node model,
said storage means stores said correlation information corresponding to each node model previously obtained with said learning image in which each face of the corresponding size is taken,
said arrangement means selects the node model used based on the size of the face detected by said face detection means when each node is arranged at said initial position based on said node model, and
said error estimator obtaining means reads and uses said correlation information from said storage means, said correlation information corresponding to the node model selected by said arrangement means.

9. The face feature point detection apparatus according to claim 1, wherein said feature value obtaining means arranges the sampling points densely as the sampling point is brought close to the node, and said feature value obtaining means arranges the sampling points non-densely as the sampling point is separated far away from the node.

10. The face feature point detection apparatus according to claim 9, wherein said feature value obtaining means arranges the sampling points according to a retina structure.

11. The face feature point detection apparatus according to claim 10, wherein a plurality of different retina structures are stored in said feature value obtaining means, and said sampling points are arranged according to the retina structure corresponding to each node.

12. The face feature point detection apparatus according to claim 1, wherein information on a correlation between said node feature value obtained in a state in which the plurality of nodes are arranged at the correct positions of the corresponding feature points in the learning image respectively and information indicating an attitude of the human face in the learning image is previously stored in said storage means, and the face feature point detection apparatus further comprises attitude estimation means for estimating the attitude of the human face taken in said input image based on the position of each node estimated by said estimation means and the correlation information on the face attitude stored in said storage means.

13. A face feature point detection apparatus which detects a face feature point in an input image with a face shape model used in an active shape model, the face feature point detection apparatus comprising:

arrangement means for arranging said face shape model at an initial position of the input image;

feature value obtaining means for obtaining a plurality of feature values based on each node position of the face shape model arranged by said arrangement means according to a retina structure, said feature value obtaining means obtaining the plurality of feature values obtained based on the same node position as one node feature value;

storage means in which a conversion vector matrix is stored as an error estimation matrix, the conversion vector matrix being previously obtained by a canonical correlation analysis, the canonical correlation analysis having inputs of a set of vectors indicating a set of node feature values obtained for the nodes in arranging said face shape model at a wrong position and a set of vectors indicating a difference between the position of each node in arranging said face shape model at a correct position and the position of each node in arranging said face shape model at said wrong position;

error estimator obtaining means for obtaining an error estimator based on the error estimation matrix stored in said storage means and the set of node feature values obtained by said feature value obtaining means, the error estimator indicating displacement between the current position of each node of the face shape model and the position of the face feature point;

changing means for changing the current position of each node of the face shape model based on said error estimator obtained by said error estimator obtaining means; and estimation means for estimating each node whose position is already changed by said changing means as the position of the face feature point.

14. A feature point detection apparatus comprising:

arrangement means for arranging a plurality of nodes at predetermined initial positions of an input image, the plurality of nodes corresponding to a plurality of feature points in an image of a predetermined target object;

feature value obtaining means for obtaining feature values at a plurality of sampling points as a node feature value of each corresponding node by arranging said plurality of sampling points around each node arranged by said arrangement means;

storage means in which feature values of a plurality of nodes arranged at positions displaced from correct positions of the corresponding feature points in a learning image and correlation information on a difference between said correct position in each node and the position displaced from said correct position are previously stored;

error estimator obtaining means for obtaining an error estimator indicating a displacement between the current position of each node and the position of the corresponding feature point based on said correlation information stored in said storage means and the node feature value of each node, the node feature value of each node being obtained by said the feature value obtaining means; and estimation means for estimating the position of each feature point in the input image based on said error estimator obtained by said error estimator obtaining means and the current position of each node.

15. A face feature point detection method comprising:

a step in which an information processing device arranges a plurality of nodes at predetermined initial positions of an input image, the plurality of nodes corresponding to a plurality of feature points in a human face;

a step in which an information processing device arranges the plurality of sampling points around each arranged node;

a step in which an information processing device obtains feature values at said plurality of sampling points as a node feature value of each corresponding node;

a step in which an information processing means obtains an error estimator indicating displacement between the current position of each node and the position of the corresponding feature point based on correlation information previously stored in a storage means of the feature values of a plurality of nodes arranged at positions displaced from correct positions of the corresponding feature points in a learning image and correlation information previously stored in the storage means regarding a difference between said correct position in each node and the position displaced from said correct position, and the node feature value of each node, the node feature value of each node being obtained by said feature value obtaining means; and a step in which an information processing means estimates the position of each feature point in the input image based on said error estimator and the current position of each node.

16. A feature point detection method comprising:

a step in which an information processing device arranges a plurality of nodes at predetermined initial positions of an input image, the plurality of nodes corresponding to a plurality of feature points in an image of a predetermined target object;

a step in which an information processing device arranges the plurality of sampling points around each arranged node;

a step in which an information processing device obtains feature values at said plurality of sampling points as a node feature value of each corresponding node;

a step in which an information processing means obtains an error estimator indicating a displacement between the current position of each node and the position of the corresponding feature point based on correlation information previously stored in a storage means of feature values of a plurality of nodes arranged at positions displaced from correct positions of the corresponding feature points in a learning image and correlation information previously stored in the storage means regarding a difference between said correct position in each node and the position displaced from said correct position, and the node feature value of each node, the node feature value of each node being obtained by said feature value obtaining means; and a step in which an information processing means estimates the position of each feature point in the input image based on said error estimator and the current position of each node.

17. A non-transitory computer-readable medium storing a program which causes an information processing device to execute:

a step of arranging a plurality of nodes at predetermined initial positions of an input image, the plurality of nodes corresponding to a plurality of feature points in a human face;

a step of arranging the plurality of sampling points around each arranged node;

a step of obtaining feature values at said plurality of sampling points as a node feature value of each corresponding node;

a step of obtaining an error estimator indicating displacement between the current position of each node and the position of the corresponding feature point based on correlation information previously stored in a storage means of feature values of a plurality of nodes arranged at positions displaced from correct positions of the corresponding feature points in a learning image and correlation information previously stored in the storage means regarding a difference between said correct position in each node and the position displaced from said correct position, and the node feature value of each node, the node feature value of each node being obtained by said feature value obtaining means; and a step of estimating the position of each feature point in the input image based on said error estimator and the current position of each node.

18. A non-transitory computer-readable medium storing a program which causes an information processing device to execute:

a step of arranging a plurality of nodes at predetermined initial positions of an input image, the plurality of nodes corresponding to a plurality of feature points in an image of a predetermined target object;

a step of arranging the plurality of sampling points around each arranged node;

a step of obtaining feature values at said plurality of sampling points as a node feature value of each corresponding node;

a step of obtaining an error estimator indicating a displacement between the current position of each node and the position of the corresponding feature point based on correlation information previously stored in a storage means of feature values of a plurality of nodes arranged at positions displaced from correct positions of the corresponding feature points in a learning image and correlation information previously stored in the storage means on a difference between said correct position in each node and the position displaced from said correct position, and the node feature value of each node, the node feature value of each node being obtained by said feature value obtaining means; and a step of estimating the position of each feature point in the input image based on said error estimator and the current position of each node.

19. A face feature point detection method in which an information processing device detects a face feature point in an input image with a face shape model used in an active shape model, the face feature point detection method comprising:

a step in which an information processing device arranges said face shape model at an initial position of the input image;

a step in which an information processing device obtains a plurality of feature values based on each node position of the arranged face shape model according to a retina structure and said information processing device obtains the plurality of feature values obtained based on the same node position as one node feature value;

a step in which an information processing device obtains an error estimator based on an error estimation matrix and the set of obtained node feature values, the error estimator indicating displacement between the current position of each node of the face shape model and the position of the face feature point, a conversion vector matrix is stored as an error estimation matrix in a storage means, the conversion vector matrix being previously obtained by a canonical correlation analysis, the canonical correlation analysis having inputs of a set of vectors indicating a set of node feature values obtained for the nodes in arranging said face shape model at a wrong position and a set of vectors indicating a difference between the position of each node in arranging said face shape model at a correct position and the position of each node in arranging said face shape model at said wrong position;

a step in which an information processing device changes the current position of each node of the face shape model based on said obtained error estimator; and a step in which an information processing device estimates each node whose position is already changed by said changing means as the position of the face feature point.

20. A non-transitory computer-readable medium storing a program, which, when executed, causes an information processing device to detect a face feature point in an input image with a face shape model used in an active shape model, by causing the processing device to execute the steps of:

arranging said face shape model at an initial position of the input image;

obtaining a plurality of feature values based on each node position of the arranged face shape model according to a retina structure and said information processing device obtains the plurality of feature values obtained based on the same node position as one node feature value;

obtaining an error estimator based on an error estimation matrix and the set of obtained node feature values, the error estimator indicating displacement between the current position of each node of the face shape model and the position of the face feature point, a conversion vector matrix is stored as an error estimation matrix in a storage means, the conversion vector matrix being previously obtained by a canonical correlation analysis, the canonical correlation analysis having inputs of a set of vectors indicating a set of node feature values obtained for the nodes in arranging said face shape model at a wrong position and a set of vectors indicating a difference between the position of each node in arranging said face shape model at a correct position and the position of each node in arranging said face shape model at the wrong position;

changing the current position of each node of the face shape model based on said obtained error estimator; and estimating each node whose position is already changed by said changing means as the position of the face feature point.

* * * * *